US011868259B2

(12) United States Patent
Papazova et al.

(10) Patent No.: US 11,868,259 B2
(45) Date of Patent: Jan. 9, 2024

(54) SYSTEM COHERENCY PROTOCOL

(71) Applicant: International Business Machines Corporation, Armonk, NY (US)

(72) Inventors: Vesselina Papazova, Highland, NY (US); Robert J. Sonnelitter, III, Bedford Hills, NY (US); Chad G. Wilson, Poughkeepsie, NY (US); Chakrapani Rayadurgam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/657,830

(22) Filed: Apr. 4, 2022

(65) Prior Publication Data
US 2023/0315635 A1  Oct. 5, 2023

(51) Int. Cl.
G06F 12/0831 (2016.01)
G06F 9/30 (2018.01)
G06F 9/54 (2006.01)
G06F 12/0817 (2016.01)

(52) U.S. Cl.
CPC ...... *G06F 12/0833* (2013.01); *G06F 9/30047* (2013.01); *G06F 9/544* (2013.01); *G06F 12/0828* (2013.01); *G06F 2212/2542* (2013.01)

(58) Field of Classification Search
None
See application file for complete search history.

(56) References Cited

U.S. PATENT DOCUMENTS 9,514,050 B1  12/2016  Agarwal et al.
9,652,404 B2   5/2017  Pierson et al.
9,720,833 B2 * 8/2017  Drapala ............... G06F 12/0824
10,402,327 B2  9/2019  Roberts et al.
2004/0230751 A1 11/2004 Blake et al.
2007/0266126 A1 * 11/2007 Clark .................. G06F 12/1458
709/223

(Continued)

FOREIGN PATENT DOCUMENTS

WO  WO-2010005514 A1 * 1/2010 ........... G06F 12/082

OTHER PUBLICATIONS

Yang et al. "Design of an Adaptive Cache Coherence Protocol for Large Scale Multiprocessors." May 1992. IEEE. IEEE Transactions on Parallel and Distributed Systems. vol. 3. pp. 281-293.*

(Continued)

*Primary Examiner* — Nathan Sadler

(74) *Attorney, Agent, or Firm* — Patterson + Sheridan, LLP

(57) ABSTRACT

Embodiments herein described a coherency protocol for a distributed computing topology that permits for large stalls on various interfaces. In one embodiment, the computing topology includes multiple boards which each contain multiple processors. When a particular core on a processor wants access to data that is not currently stored in its cache, the core can first initiate a request to search for the cache line in the caches for other cores on the same processor. If the cache line is not found, the cache coherency protocol permits the processor to then broadcast a request to the other processors on the same board. If a processor on the same board does not have the data, the processor can then broadcast the request to the other boards in the system. The processors in those boards can then search their caches to identify the data.

21 Claims, 15 Drawing Sheets

(56) References Cited

U.S. PATENT DOCUMENTS

| | | | |
|---|---|---|---|
| 2009/0138660 A1* | 5/2009 | Bell, Jr. | G06F 12/0831 |
| | | | 711/130 |
| 2009/0193198 A1 | 7/2009 | Papazova et al. | |
| 2009/0210626 A1 | 8/2009 | Papazova et al. | |
| 2014/0201468 A1* | 7/2014 | Blaner | G06F 12/0804 |
| | | | 711/146 |
| 2016/0147662 A1 | 5/2016 | Drapala et al. | |
| 2017/0242797 A1* | 8/2017 | Wang | G06F 12/0817 |
| 2018/0341587 A1 | 11/2018 | Blake et al. | |
| 2018/0365070 A1* | 12/2018 | Blake | G06F 9/5011 |
| 2019/0220409 A1* | 7/2019 | Guthrie | G06F 12/0811 |
| 2020/0042449 A1* | 2/2020 | Marino | G06F 9/4881 |

OTHER PUBLICATIONS

Ren, X., Lustig, D., Bolotin, E., Jaleel, A., Villa, O., & Nellans, D. (2020, February). Hmg: Extending Cache Coherence Protocols Across Modern Hierarchical Multi-GPU Systems. In 2020 IEEE International Symposium on High Performance Computer Architecture (HPCA) (pp. 582-595). IEEE.

Franques, A., Kokolis, A., Abadal, S., Fernando, V., Misailovic, S., & Torrellas, J. (2021, February). WIDir: A Wireless- Enabled Directory Cache Coherence Protocol. In 2021 IEEE International Symposium on High-Performance Computer Architecture (HPCA) (pp. 304-317). IEEE.

Liu, Z., Bai, Z., Liu, Z., Li, X., Kim, C., Braverman, V., . . . & Stoica, I. (2019). DistCache: Provable Load Balancing for Large-Scale Storage Systems with Distributed Caching. In 17th (USENIX} Conference on File and Storage Technologies ((FAST} 19) (pp. 143-157).

PCT, Notification of Transmittal of The International Search Report and The Written Opinion of The International Searching Authority, or The Declaration for Application PCT/EP2023/057046 dated Jun. 19, 2023.

* cited by examiner

SYSTEM COHERENCY PROTOCOL

BACKGROUND

The present invention relates to a coherency protocol in a shared-memory multiprocessing (SMP) computing system.

New computing systems rely on highly distributed system topologies with high-speed interfaces between processors (e.g., between processor chips). High interface speeds lead to reliability issues and the need for new bus recovery mechanisms. Interface recovery mechanisms on high-speed interfaces can lead to large stalls and unpredictable message propagation speed. This creates various challenges in maintaining data integrity in a cache coherent system. Thus, there is a need for improved cache coherency protocols in distributed system topologies with processors distributed on different boards or platforms.

SUMMARY

According to one embodiment of the present invention, a method includes providing a cache coherent computing system comprising a plurality of boards, each board comprising a plurality of processors; requesting cached data for a first core in a first processor on a first board of the plurality of boards; upon determining that another core on the first processor does not have the requested cached data, broadcasting a request to the other processors on the first board to determine whether one of the other processors is an intervention master (IM) of the requested cached data; and upon determining none of the other processors on the first board are the IM, broadcasting a request to the other boards of the plurality of boards to determine whether one of the processors in the other boards is the IM. One advantage is that this cache coherency method is tolerant to the variable delays as the cache operations move to higher scopes (e.g., board to board communication).

The method can also include receiving, at the first processor, partial responses (PRESP) from the other processors on the first board, determining, based on the PRESPs, which of the other processors are still participating in the request and other operations initiated by the other processors for the same cached data, where at least one of the other processors indicates in its PRESP that it is not participating in the request, transmitting a combined response (CRESP) to only the other processors that are still participating in the request. One advantage is this limits the number of processors that continue in the coherency action, thereby freeing the non-participating processors to perform other functions.

The method also includes that the other processors that are still participating in the request comprise fork processors in the first board that are assigned to communicate with a respective one of the plurality of boards. One advantage is, at this point of time, the fork processor may still be used to transmit to other boards since the first processor does not yet know if the IM for the requested data is on the same board.

The method also includes receiving the request at a respective branch processor at each of the other boards, broadcasting the request from the respective branch processors to the other processors in a same board, receiving, at the respective branch processors, PRESPs from the other processors in the same board reporting other operations in flight for the same cached data, forwarding the PRESPs from the other processors in the other boards to the first processor on the first board, transmitting a board-scope CRESP from the respective branch processors to only other processors in the same board that indicated they are still participating in the request based on the PRESPs, and transmitting a global-scope CRESP from the first board to the other processors in the other boards that indicated they are still participating in the request based on the PRESPs. One advantage of the board-scope CRESP and the global-scope CRESP is that they only involve processors at the board-scope and the global-scope that are still participating in the cache operation.

The method also includes a first one of the other processors indicating they are still participating in the request is the IM of the requested cached data or has an operation in flight for the same cached data, and a second one of the other processors indicating they are still participating in the request is not the IM of the requested cached data. One advantage is that any processor that is requesting the same cached data as the first processor receives the communication and knows that the IM has been changed.

According to one embodiment of the present invention, a cache coherent computing system includes a plurality of boards, each board comprising a plurality of processors where a first core in a first processor on a first board of the plurality of boards is configured to request cached data that is not stored in a cache assigned to the first core. Upon determining that another core on the first processor does not have the requested cached data, the first processor is configured to broadcast a request to the other processors on the first board to determine whether one of the other processors is an intervention master (IM) of the requested cached data. Upon determining none of the other processors on the first board are the IM, the first processor is configured to broadcast a request to the other boards of the plurality of boards to determine whether one of the processors in the other boards is the IM. One advantage is that this cache coherency method is tolerant to the variable delays as the cache operations move to higher scopes (e.g., board to board communication).

According to one embodiment of the present invention, a computer program product for maintaining a cache coherent computing system comprising a plurality of boards, each board comprising a plurality of processors, the computer program product including a computer readable storage medium having computer-readable program code embodied therewith, the computer readable program code executable by one or more computer processors to perform an operation. The operation includes requesting cached data for a first core in a first processor on a first board of the plurality of board; upon determining that another core on the first processor does not have the requested cached data, broadcasting a request to the other processors on the first board to determine whether one of the other processors is an intervention master (IM) of the requested cached data; and upon determining none of the other processors on the first board are the IM, broadcasting a request to the other boards of the plurality of boards to determine whether one of the processors in the other boards is the IM. One advantage is that this cache coherency method is tolerant to the variable delays as the cache operations move to higher scopes (e.g., board to board communication).

According to one embodiment of the present invention, a cache coherent computing system including a plurality of boards, each board comprising a plurality of processors where a first core in a first processor on a first board of the plurality of board is configured to request cached data that is not stored in a cache assigned to the first core. Upon determining that another core on the first processor does not have the requested cached data, the first processor is configured to broadcast a request to the other processors on the first board to determine whether one of the other processors is an intervention master (IM) of the requested cached data; receive partial responses (PRESPs) from the other processors on the first board; determine, based on the PRESPs, which of the other processors are still participating in the request where a first one of the other processors indicates in its PRESP that it is the IM, and a second one of the other processors indicates in its PRESP that it is not the IM but it is still participating in the request; and transmit a combined response (CRESP) to only the other processors that indicate in their PRESPs that they are still participating in the request. One advantage is that this cache coherency method is tolerant to the variable delays as the cache operations move from intra-processor communication to inter-processor communication between processors on the same board.

DETAILED DESCRIPTION

Embodiments herein described a coherency protocol for a distributed computing topology that permits large stalls on various interfaces (e.g., interfaces between different motherboards containing the processor chips). In one embodiment, the computing topology includes multiple boards (e.g., multiple motherboards, also referred to as "drawers") which each contain multiple processors (e.g., multiple processor chips). When a particular core on a processor wants access to data that is not currently stored in its cache, the core can first initiate a request to search for the cache line in the caches of other cores on the same processor. If the cache line is not found, the processor then broadcasts a request to the other processors on the same board. For example, the processors in the board may be connected via a fully connected fabric. If a processor on the same board does not have the data, the processor can then broadcast the request to the other boards in the system. The processors in those boards can then search their caches to identify the data.

One problem with performing coherency operations in a multi-scope system is that the latency involved when performing cache operations (e.g., snoops, cache response, etc.) can vary greatly at each level or scope (e.g., searching caches in the same processor, versus searching caches in processors on the same board, versus searching caches in processors on different boards). The multi-scope coherency protocol described herein can ensure fast data sharing in a lower scope (e.g., when searching caches in the same processor) and can tolerate increased latency as the request progresses to higher scopes (e.g., searching caches in processors on the same board or searching caches in processors on different boards). The multi-scope coherency protocol can be tolerant to the variable delays as the cache operations move to higher scopes. Advantageously, the multi-scope coherency protocol can be used in different system topologies and still maintain data integrity.

Figure 1:
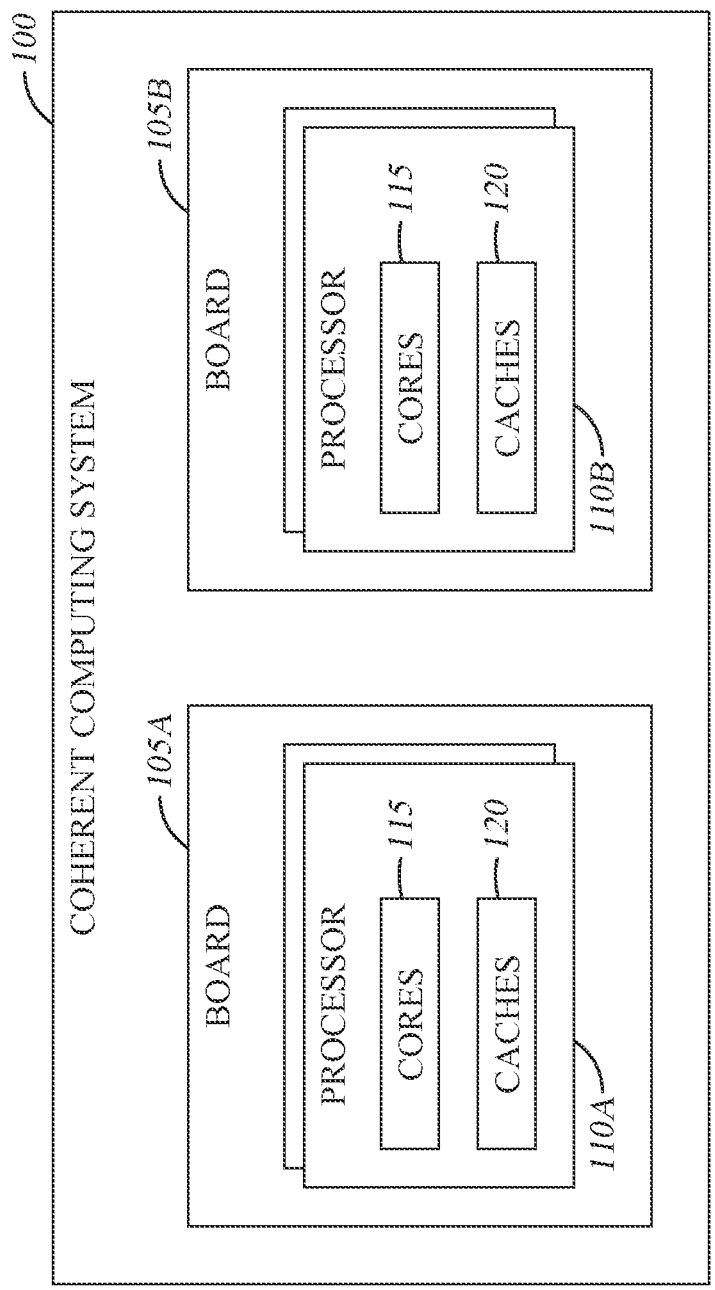
FIG. 1 illustrates a cache coherent computing system with a distributed topology, according to one embodiment.

FIG. 1 illustrates a cache coherent computing system 100 with a distributed topology, according to one embodiment. In this example, the topology of the system 100 is distributed because processors 110 (e.g., central processing units (CPUs)) are distributed on different boards 105 (e.g., different motherboards or drawers) in the computing system. The communication techniques used to communicate between processors 110 on the same board 105 may be different than the communication techniques used to communicate between processors 110 on different boards 105. For example, communicating messages or performing cache operations between processors 110 on different boards 105 may, in general, incur more latency than performing cache operations between processors 110 on the same board 105.

The computing system 100 may be any computing system such as a server, blade server, rack server, tower server, desktop computer, laptop, and the like. In one embodiment, the computing system 100 includes a chassis that contains the hardware elements shown in FIG. 1. In one embodiment, the chassis may be mountable so that the computing system 100 can be mounted in a rack or tower.

In this example, the computing system 100 includes two boards: board 105A and 105B which each contains multiple processors 110. However, the computing system 100 can have any number of boards (e.g., three, four, eight, etc.) which each contain any number of processors (e.g., two, four, six, eight, sixteen, etc.). Each processor 110 includes one or more cores 115 (e.g., one, four, eight, etc.) and caches 120. Some of the caches may be integrated into the cores (e.g., a Level 1 (L1)) cache while other caches 120 are external to the cores 115 (e.g., Level 2 (L2) and Level 3 (L3) caches). The embodiments herein are not limited to any particular number of cache levels or cache hierarchy. Although not shown, the computing system 100 can also include main memory (e.g., random access memory) which may be separate from the boards 105 or disposed on the boards. The computing system 100 can also include long term storage such as hard drives.

In a shared memory multiprocessor system like the computing system 100 with a separate cache 120 for each processor 110, it is possible to have many copies of shared data—e.g., one copy in the main memory (not shown) and one in the local cache of each processor that requested it. However, maintaining coherency of data in highly distributed topology that uses high speed interfaces with long recovery mechanisms is difficult and can benefit from a techniques discussed herein. For example, to ensure data integrity of a cache line while it is moving, the old owner of the cache line should keep protection of the cache line until the new owner starts protecting the data and all other operations in flight for the same cache line are rejected (e.g., when two cores 115 are requesting the same cache line at the same time).

The embodiments herein establish several coherency protocol rules to address a computing system with a distributed topology. In this example, the topology of the computing system 100 has three different scopes: (1) a processor scope, (2) a board scope, and (3) inter-board scope (or global scope). The multi-scope coherency protocol described here addresses the heterogeneous nature of the system topology in the system 100 that has limited resources and enables fast and fair line sharing when communicating between processors on the same board 105 and different boards 105. The embodiments herein introduce a combined response (CRESP) that is not dependent on another operation to complete. That is, no other operations can stop the production of the CRESP. Further, the multi-scope coherency protocol can be time delay tolerant (e.g., time irrelevance) by using a coherency protocol (also referred to as a fabric (FBC) protocol) that handles arbitrary delays resulting from cache operations being transmitted between processors 110 on the same board 105 and on different boards 105. The coherency protocol is responsible for handling off-chip broadcasts and all associated messages and coherency aspect of maintaining data coherency. Further, an intervention master (IM) can complete its tasks without any dependencies to other operations from the same or lower scope. That is, nothing blocks the IM from completing the handoff of the requested cache line to a new owner. As used herein, the IM is the highest point of coherency for a given scope and contains the most recent cached copy of the cache line. The IM is typically a cache on a processor 110 (or a core 115 within the processor 110) but can be memory (e.g., a cache 120) if no core current owns the cache line. Further, in one embodiment, the multi-scope coherency protocol has request observability where no actor external to the current scope can block a request from broadcasting a request in that scope.

Figure 2:
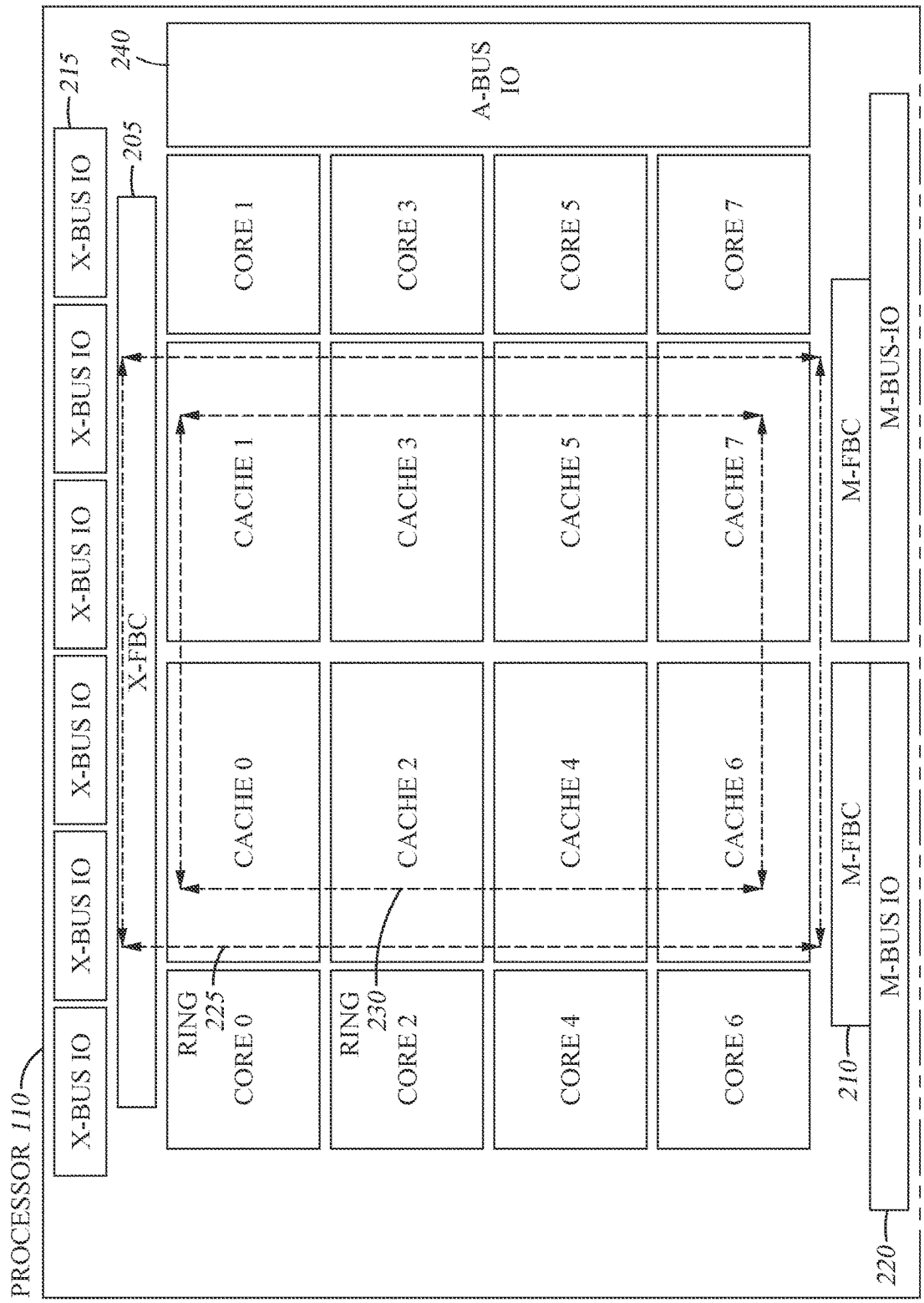
FIG. 2 illustrates a processor chip, according to one embodiment.

FIG. 2 illustrates a processor 110, according to one embodiment. In one embodiment, the processor 110 is an integrated circuit (e.g., a single chip). The processor 110 in FIG. 2 is one example implementation of the processors 110 illustrated in FIG. 1.

The processor 110 includes eight cores (Cores 0-7) and eight caches (Caches 0-7). In one embodiment, the caches are owned by a respective core—e.g., Cache 0 is owned by Core 0, Cache 1 is owned by Core 1, and so forth. As shown, the cores have direct connections to the caches they own, but may not have direct connections to caches they do not own. The caches may be L1, L2, or L3, caches.

The processor 110 also includes a X-FBC 205 and a M-FBC 210. In FIG. 2, the "X" designation indicates circuitry that is tasked with communicating with processors in different sockets but on the same board while the "M" designation indicates circuitry that is tasked with communication with processors in the same socket on the board as the processor 110. These sockets and connections are discussed in FIG. 3. However, the embodiments herein can also apply to computing systems where the processors are not arranged (or packaged) in different sockets on the board.

The FBCs 205, 210 are fabric logic that manages coherency between multiple processors. That is, the processor 110 uses the FBCs 205, 210 when transmitting and receiving caching operations with other processors. For example, if the processor 110 sends a request for a cache line to a processor in the same socket, it uses the M-FBC 210 to communicate with the processor. However, if the processor 110 sends a request for a cache line to a processor in a different socket, it uses the X-FBC 205 to communicate with the processor.

The processor 110 also includes X-bus input/output (IO) 215 and M-bus IO 220. Like the FBCs 205, 210, the X-bus IO 215 is an IO interface for communicating with a processor on a different socket while the M-bus IO 220 is an IO interface for communicating with a processor on the same socket. Again, other topologies can have different arrangements that do not package processors into sockets. The processor 110 also includes an A-bus IO 240 which the FBC units use to connect to other boards.

In this example, the processor 110 uses rings 225 and 230 to communicate between the caches. Two rings are used in FIG. 2 to illustrate that different types of data can be transmitted between the caches. For example, the outer ring 225 can represent the path used by coherency messages (e.g., snoops and response messages) while the inner ring 230 can represent the data buses between the caches.

Assume that Core 2 wants to read and process data at a particular cache line. Core 2 first searches its internal cache (if it has any), and if it does not find the cache line (i.e., a cache miss), then queries its own cache—i.e., Cache 2. If Cache 2 does not own the cache line, Core 2 transmits a request to the other cores to search their caches for the cache line. This request can travel along the ring 225 to the different caches. In one embodiment, the request may be transmitted in one direction or in both directions simultaneously. The caches/cores can then respond to the request indicating whether they do or do not own the requested cache line.

While FIG. 2 illustrates using a ring topology for performing cache operations in a processor 110, this is just one example. The embodiments herein are not limited to any particular technique for performing cache operations in a single chip/processor, but instead can be used with any other types of techniques for performing cache operations in a single processor such as a mesh network, cross bar, etc. Thus, the rings 225, 230 are just one suitable technique from propagating cache operations in a chip.

Figure 3:
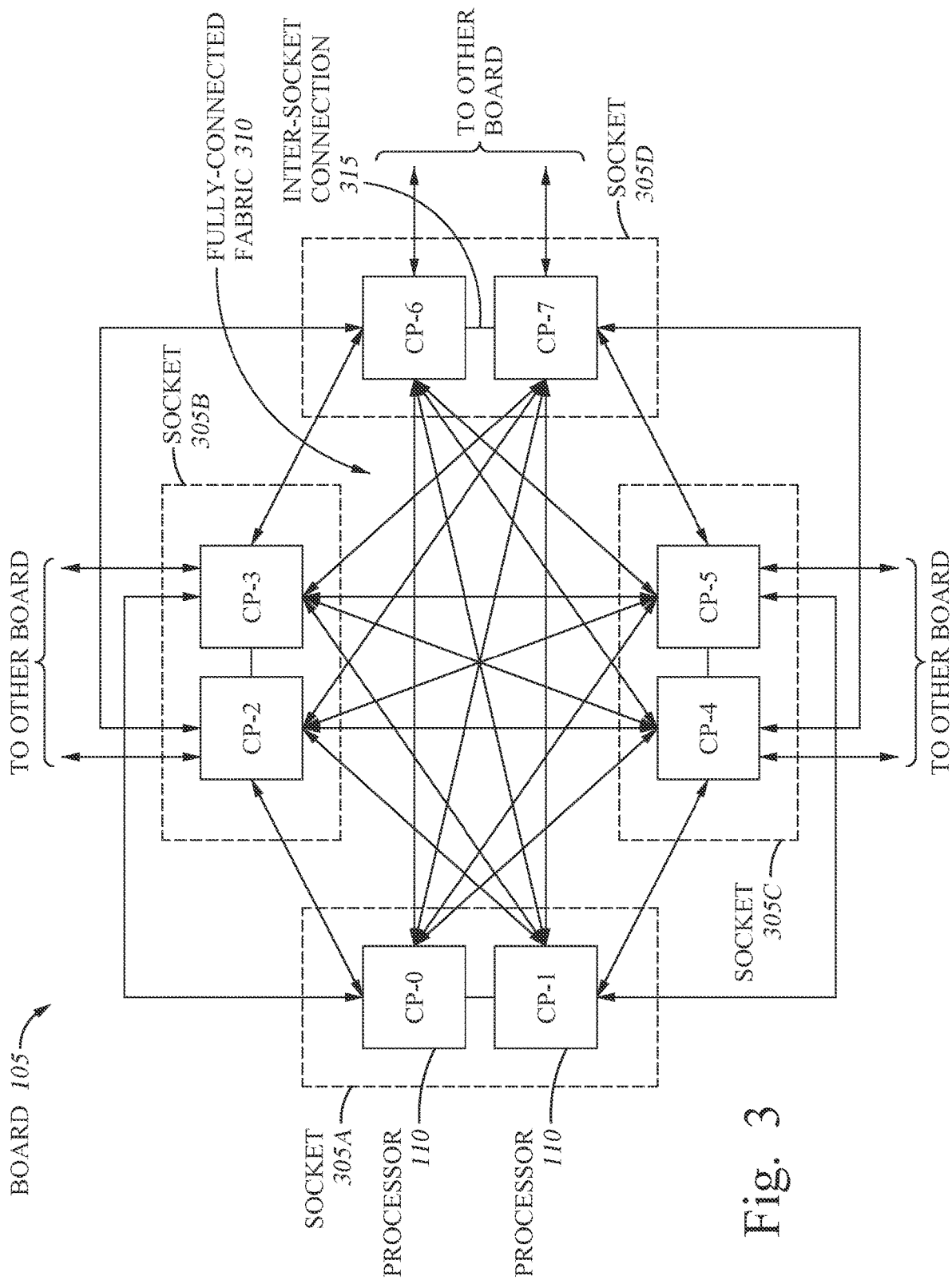
FIG. 3 illustrates a communication system between processors on a board, according to one embodiment.

FIG. 3 illustrates a communication system between processors 110 on a board 105, according to one embodiment. For example, the computing system 100 in FIG. 1 can have multiple instances of the board 105 shown in FIG. 3.

In this example, the board 105 includes four sockets 305A-D which each contain two processors 110. The sockets 305 can then be coupled to a common substrate (e.g., a printed circuit board). For example, the processors 110 in the same socket 305 may be packaged together and can be disposed on a common substrate (e.g., an interposer). However, the embodiments herein are not limited to a board 105 with sockets and can include embodiments where the processors 110 are directly attached to the board 105.

The board 105 includes a fully-connected fabric 310 for communicatively coupling together processors 110 that are on different sockets 305. In this example, the processors in each socket have direct connections in the fully-connected fabric 310 to each processor in a different socket. That is, the processor CP-0 has direct connections to the processors CP-2/CP-3 in socket 305B, to the processors CP-4/CP-5 in socket 305C, and to the processors CP-6/CP-7 in socket 305D. Referring back to FIG. 2, the six connections to these six processors can be made using the six X-bus IOs 215 at the top of the processor 110.

The board 105 also includes inter-socket connections 315 to connect the processors in the same socket 305. That is, the processor CP-0 uses an inter-socket connection 315 to communicate with the processor CP-1, the processor CP-2 uses an inter-socket connection 315 to communicate with the processor CP-3, and so forth. Referring back to FIG. 2, the inter-socket connection to a processor in the same socket can be made using one of the M-bus IOs 220 at the bottom of the processor 110.

The fully-connected fabric 310 and the inter-socket connections 315 guarantee that each processor 110 has a direct communication link to every other processor 110 on the same board 105. That is, there are guaranteed resources that can be used for one processor to communicate with all the other processors in the same board. In this example a "direct communication link" means the processor 110 can communicate with another processor on the same board 105 without having to use another processor as an intermediary (e.g., as would be the case with, for example, a spine-leaf topology). Moreover, the fully connected fabric 310 can be time irrelevant in that cache coherency can be maintained when there is additional latency or transmission errors.

Figure 4:
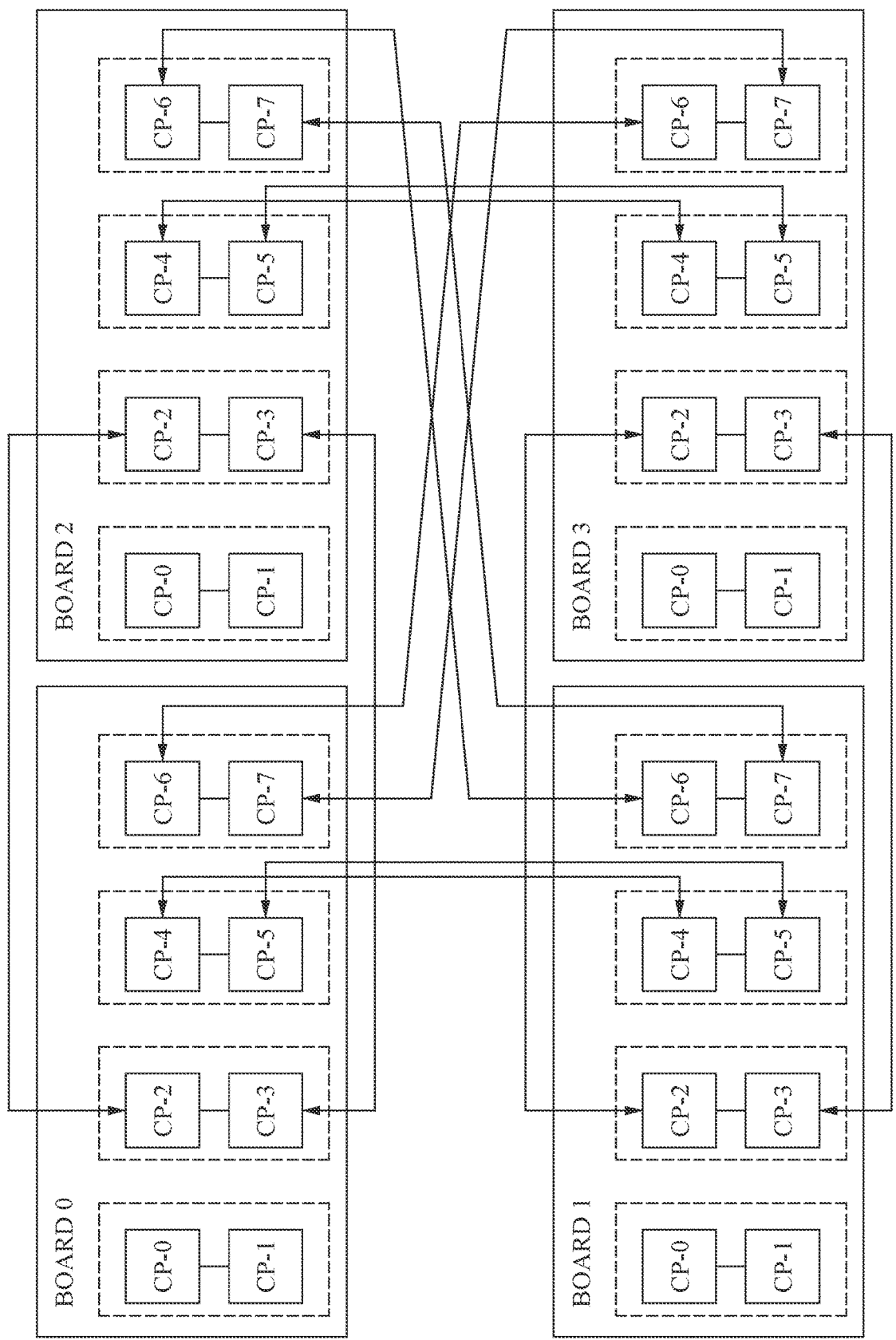
FIG. 4 illustrates communication between boards in a cache coherent computing system, according to one embodiment.

FIG. 4 illustrates communication between boards in a cache coherent computing system, according to one embodiment. Each board 105 (Board 0-3) contains four sockets and eight processors as shown in FIG. 3. The lines illustrate inter-board connections between the boards. In this example, each board has a socket (i.e., two processors) that are assigned to communicate with a different board, which are referred to as fork processors. Using Board 0 as an example, the processors CP-2/CP-3 are connected to a pair of processors in Board 2, the processors CP-4/CP-5 are connected to a pair of processors in Board 1, and the processors CP-6/CP-7 are connected to a pair of processors in Board 3. When a processor wants to transmit a cache message to a different board, it can use the fork processor to reach the board. For example, if the processor CP-0 in Board 0 wants to transmit a response to a processor in Board 3, the processor CP-0 first transmits the response to one of the processors CP-6/CP-7 in Board 0 which then forward that response to processors CP-6/CP-7 in Board 3.

In one embodiment, the processors assigned to communicate with other boards can have a ticket manager that manages cache operations flowing between the boards. The ticket manager can use a queue to determine which cache operations are sent next.

Unlike in FIG. 3 where the processors have a direct connection to every other processor, in FIG. 4 a processor on one board may not have a direct communication link to a processor in a different board. That is, a processor may have to rely on one or two processors (e.g., the fork processors) in order to communicate cache requests or response to a processor in a different board. Thus, FIG. 4 can be referred to as a pass-through topology where certain processors are used as intermediaries between other processors on different boards. For example, the CP-0 in Board 0 relies on processors CP-2/CP-3 to reach Board 2, processors CP-4/CP-5 to reach Board 1, and processors CP-6/CP-7 to reach Board 3.

Figure 5:
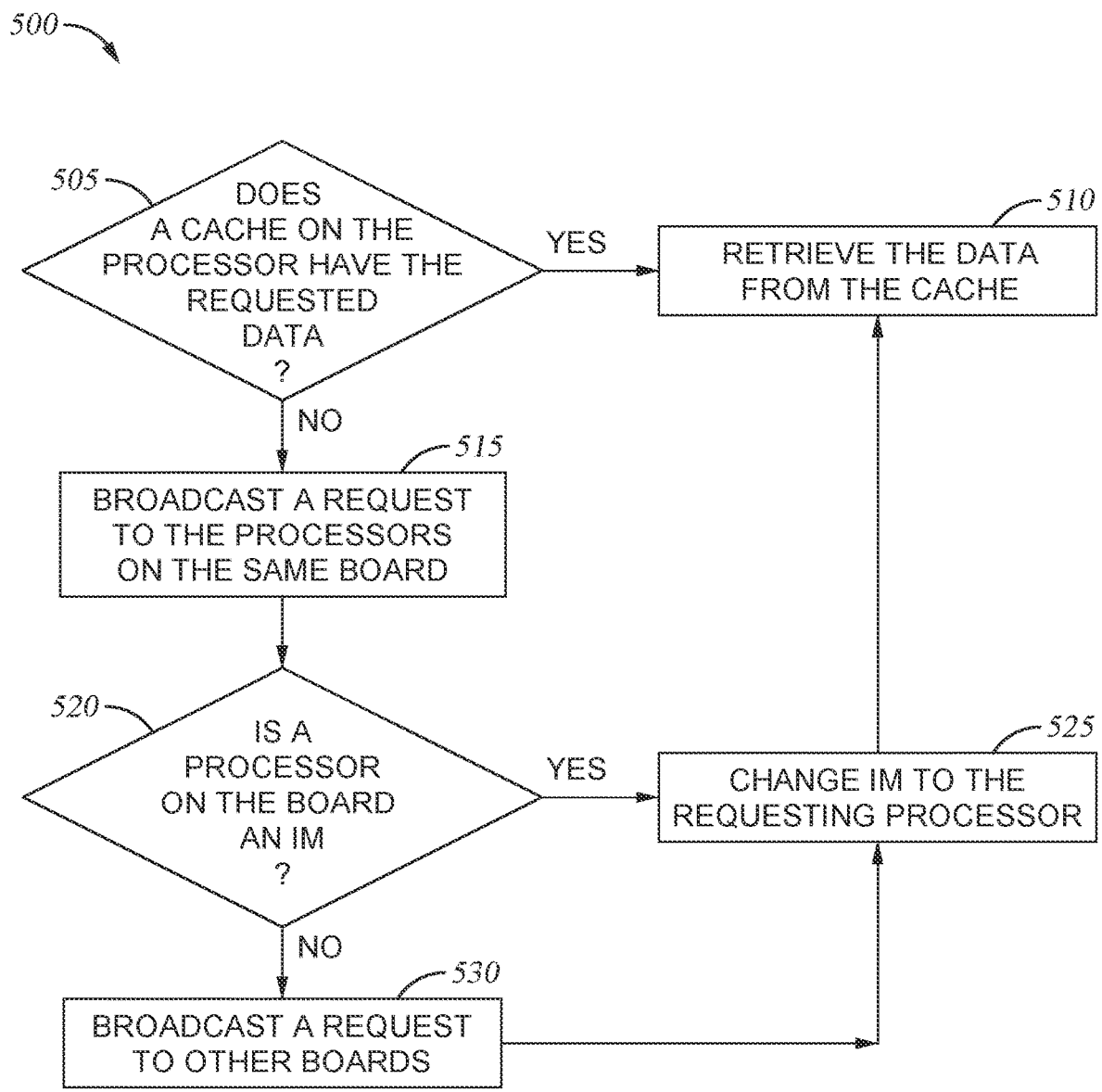
FIG. 5 is a flowchart for identifying cached data in a distributed topology, according to one embodiment.

FIG. 5 is a flowchart of a method 500 for identifying cached data in a distributed topology, according to one embodiment. At block 505, a requester (e.g., a core on a processor) determines whether a cache on the processor has requested data (e.g., a particular cache line). For example, the requester may search an internal L1 cache (if it has one) and an assigned L2 cache (e.g., the Caches 0-7 in FIG. 2) to determine whether these caches have the most up to date copy of the requested data. For example, the requesting core can use a communication network in the processor (e.g., the ring topology in FIG. 2 or a mesh network) to determine whether caches assigned to other cores in the processor contain the requested data. If so, the method 500 proceeds to block 510 where the requester retrieves the up to date version from the cache in the processor.

However, if none of the caches in the processor have the most up to date version requested data, the method 500 proceeds to block 515 where the processor broadcast a request to the processors on the same board. For example, the processor can use the fully-connected fabric 310 and inter-socket connections 315 in FIG. 3 to broadcast the request to the processors in the same socket and different sockets on the board 105. However, the connections illustrated in FIG. 3 are just one example of connecting together processors disposed on the same board.

At block 520, the processors determine whether they are the IM for the requested data. That is, after receiving the broadcast, each processor determines whether it is the IM for the data. That is, the processors determine whether they are the highest point of coherency and contain the most recent cache copy of the requested data.

The details for searching the processors in the same board to determine whether one of these processors in the IM for the requested data are discussed in FIGS. 6A-6F below.

If one of the processors on the same board is the IM, the method proceeds to block 525 where the IM is changed to the requesting processor. Doing so tasks the requesting processor to protect the cache line, as discussed in more detail below. In addition, at block 510, the requested data can be copied from a cache in the processor that was previously the IM to the requesting processor.

If none of the processors on the board are the IM for the requested data, the method proceeds to block 530 where the requesting processor broadcast a request to processors on other boards to determine whether those processors are the IM for the data (or whether the data is not owned by any core but is instead owned by a cache in a processor).

The details for searching the processors in different boards to determine whether one of these processors are the IM for the requested data is discussed in FIGS. 7A-7H below.

The method 500 assumes that one of the processors on a different board is the IM for the requested data. At block 525, the IM is changed to the requesting processor and at block 510 the requested data is copied from a cache in the processor that was previously the IM to the requesting processor. However, if none of the processors in the computing system are the IM for the requested data, the computing system may instead retrieve the data from main memory or long term storage (e.g., a hard drive).

FIGS. 6A-6F illustrate identifying cached data in a board 105 containing multiple processors 110, according to one embodiment. For ease of explanation, the board 105 has the same arrangement of sockets and processors as shown in FIGS. 3 and 4, except the eight processors are labeled CP_A-CP_H. The FIGS. 6A-6F illustrate steps that can be performed at block 515 and 520 to identify whether a processor on a board (e.g., at the board scope or level) is the IM for the requested data.

Figure 6A:
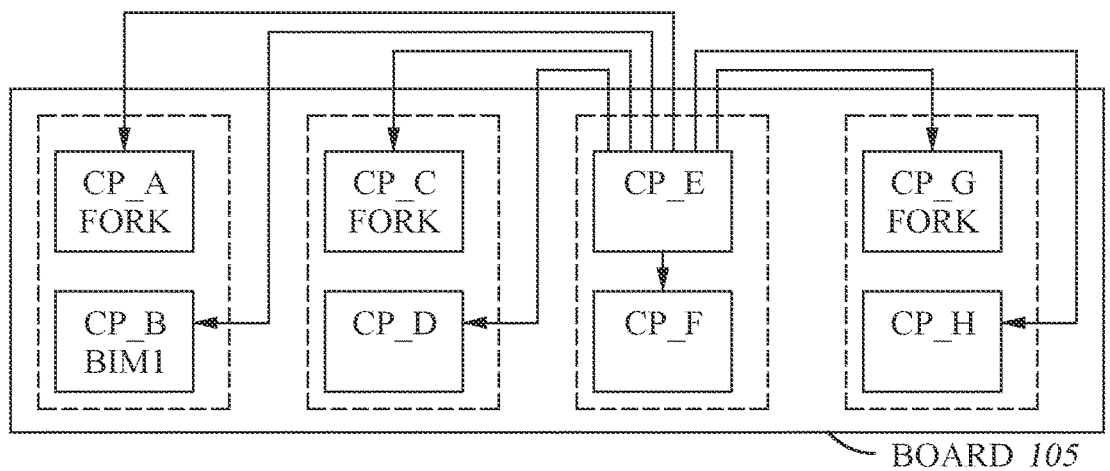
FIGS. 6A-6F illustrate identifying cached data in a board containing multiple processors, according to one embodiment.

In this example, processor CP_E is a home processor that is requesting data (e.g., a cache line). That is, the processor CP_E wants to become the IM for the data so it can ensure it has the most recent copy of the data. FIG. 6A illustrates the processor CP_E broadcasting a request to all the other processors in the same board 105. For example, the processor CP_E can use the fully-connected fabric 310 and the inter-socket connections 315 in FIG. 3 to broadcast the request to each of the processors CP_A, CP_B, CP_C, CP_D, CP_F, CP_G, and CP_H.

Figure 6B:
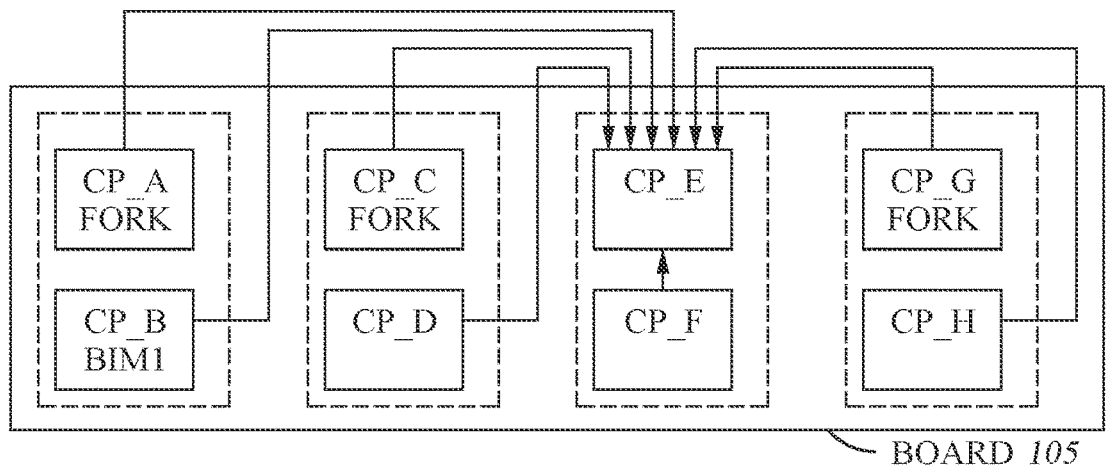

FIG. 6B illustrates the processor CP_E receiving partial responses (PRESPs) from each of the processors. There PRESPs can be received at different times. As mentioned above, the board scope can be time tolerant such that the PRESPs from the processors can be received at different times, based on, e.g., the available bandwidth of the connections and the usage of the processors. In one embodiment, the processor CP_E waits until it receives all the PRESPs before proceeding.

In one embodiment, the PRESPs indicate whether the processor is the IM, or if the processor may be tasked for identifying the IM if the IM is on a different board. In this case, the processor CP_B is the IM for the requested data (labeled as board IM 1 (BIM1)). Thus, its PRESP indicates to the processor CP_E it is the IM for the data. Further, the processors CP_A, CP-C, and CP_G are labeled as "forks" in FIGS. 6A-6F which indicates these processors are assigned to be used to communicate with other boards. That is, if the IM were not disposed on the board 105, the processors CP_A, CP-C, and CP_G would be tasked with then broadcasting the request to the other boards in the computing system, which is discussed in FIGS. 7A-7H. For example, the processor CP_A may be responsible for exchanging cache operation messages with Board 1, the processor CP_C may be responsible for exchanging cache operation messages with Board 2, and the processor CP_G may be responsible for exchanging cache operation messages with Board 3.

Because at the time depicted at FIG. 6B the fork processors do not yet know when sending their PRESPS whether the IM is disposed on the board 105, their PRESPS indicate that they will remain on stand-by in case the processor CP_E has to broadcast a request for the data to the other boards. That is, the fork processors do not indicate in their PRESPs to the processor CP_E that their part in the cache operation is complete.

In contrast, the processors CP_D, CP_F, and CP_H are neither the IM for the requested data, nor are they fork processors used to communicate with other boards. Thus, PRESPs sent by the processors CP_D, CP_F, and CP_H indicate to the processor CP_E that their part in the cache operation is complete and they no longer take part in the request.

Figure 6C:
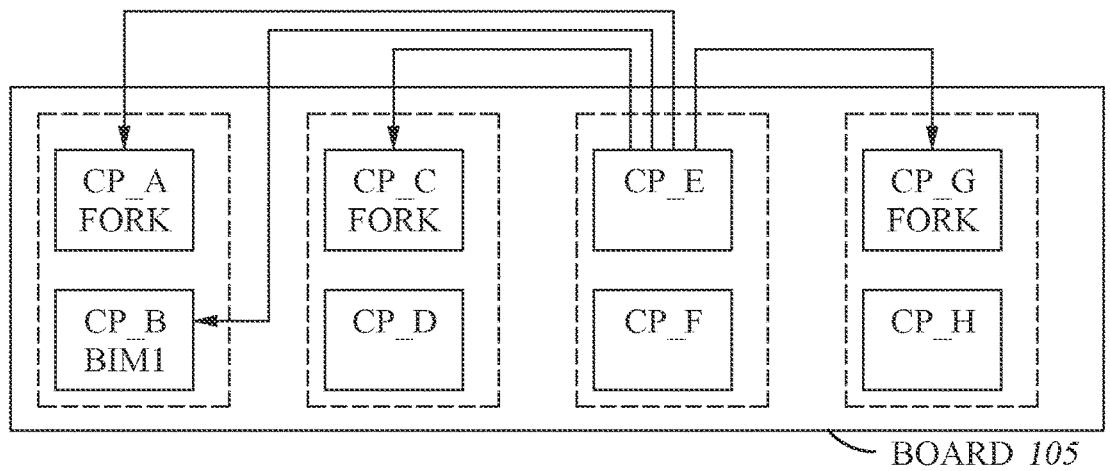

FIG. 6C illustrates the processor CP_E transmitting a combined response (CRESP) in response to receiving all the PRESPs (i.e., the partial responses from the other processors on the board 105). As shown, the CRESP is not broadcast to all the processors on the board 105, but rather only to the processors that indicated they are still part of the cache operation (i.e., the processors that are the IM for the requested data, the home memory controller for the data, processors that have an active outstanding request for the same cache line, or fork processors used to communicate with other boards in the computing system). Thus, the processors CP_D, CP_F, and CP_H do not receive the CRESP.

The CRESP informs the fork processors CP_A, CP-C, and CP_G that the IM for the data was found, and thus, they will not be needed to transmit messages to other boards. Stated differently, the fork processors are no longer needed in order to complete the cache operation. In contrast, the CRESP informs the IM (i.e., processor CP_B) that it is still needed to complete the operation.

Figure 6D:
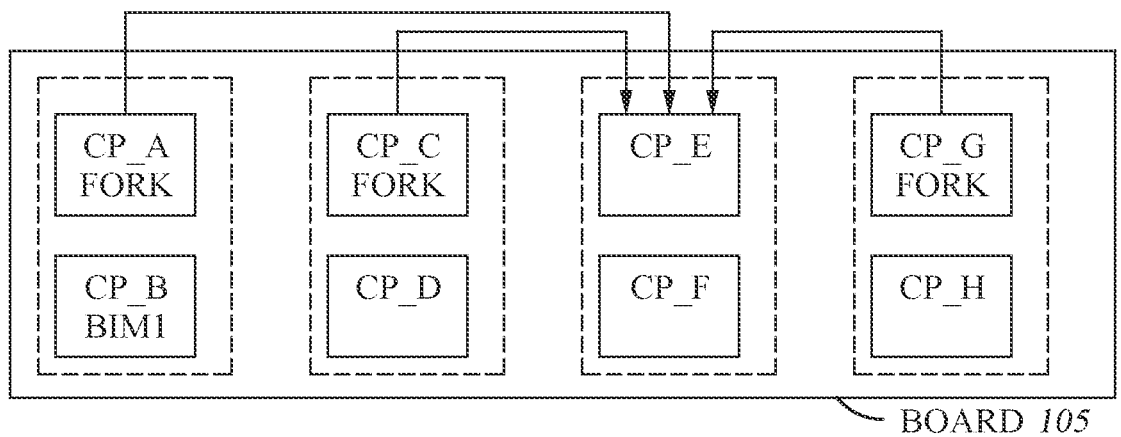

FIG. 6D illustrates the fork processors CP_A, CP-C, and CP_G transmitting reset responses (RRESP) to the processor CP_E. These RRESPs inform the processor CP_E that the processors CP_A, CP-C, and CP_G are finished with the cache operation.

Figure 6E:
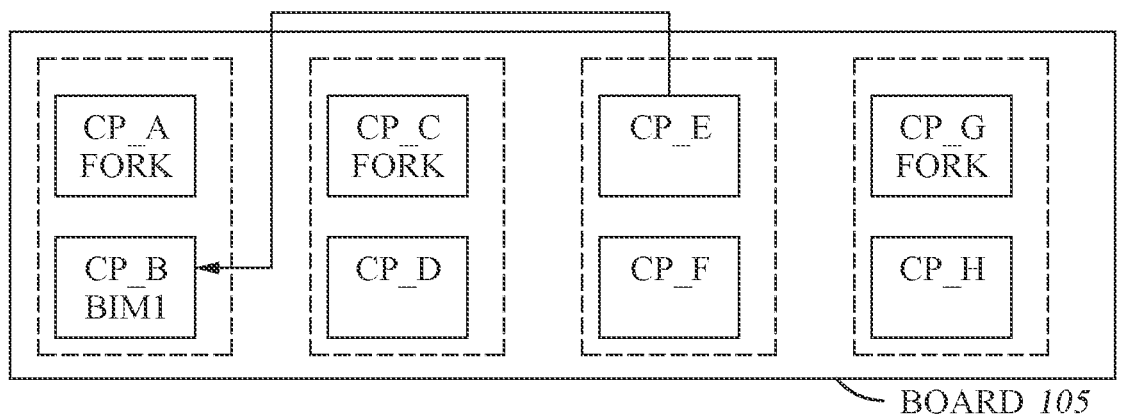

FIG. 6E illustrates the processor CP_E transmitting an end-of-coherency response (ERESP) to the processor CP_B. The ERESP tells the processor CP_B it is safe to stop protecting the requested data and that the home processor CP_B is now responsible for protecting the requesting data. In other words, the ERESP indicates it is safe for the old IM (i.e., the processor CP_B) to reset coherency protection. The old IM can stop rejecting new request for the data. The ERESP indicates the new IM (i.e., the processor CP_E) is now capable of handling further requests for the data. Moreover, the ERESP informs the old IM that the new IM is sure all potential observers are satisfied.

Figure 6F:
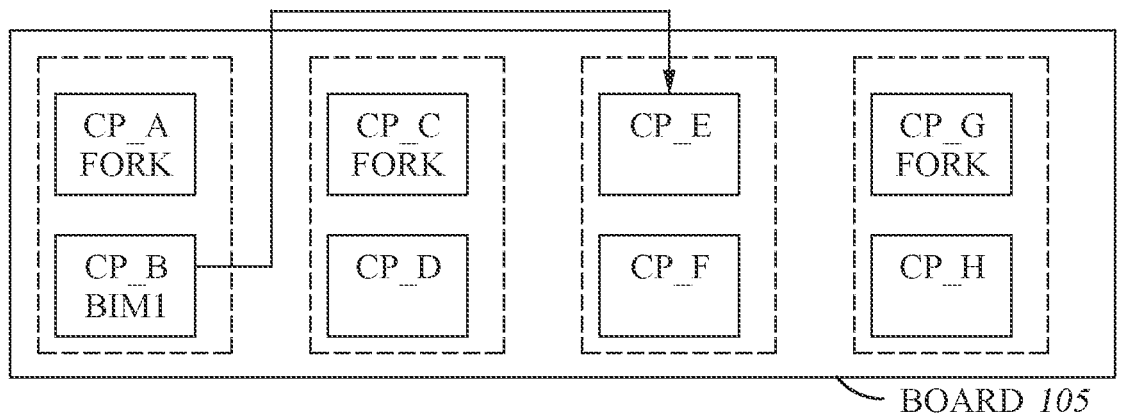

In response to receiving the ERESP, in FIG. 6F the processor CP_B transmits a RRESP to the processor CP_E indicating it is finished with the cache operation. Further, the ERESP indicates to the processor CP_E that any other requester for the same data (e.g., another processor on the board or on a different board) should have observed the transfer and that the data is in transit. Thus, this prevents conflicts where processors requesting the same data in parallel may not know which processor is currently the IM for the data.

FIGS. 7A-7H illustrate identifying cached data in multiple boards, according to one embodiment. For ease of explanation, each of the boards 105A-D in FIGS. 7A-7H have the same arrangement of sockets and processors as the board 105 in FIGS. 6A-6F. The FIGS. 7A-7H illustrate steps that can be performed at block 530 to identify whether a processor on a different board (e.g., the inter-board scope or level) is the IM for the requested data.

FIGS. 7A-7H assume that blocks 505-525 of the method 500 have already been performed and the requesting processor has determine that (i) it does not have the most recent cached copy of the requested data and (ii) the IM for the data is not on the same board. As such, the requesting processor broadcasts a request to identify the IM to the other boards in the system.

Figure 7A:
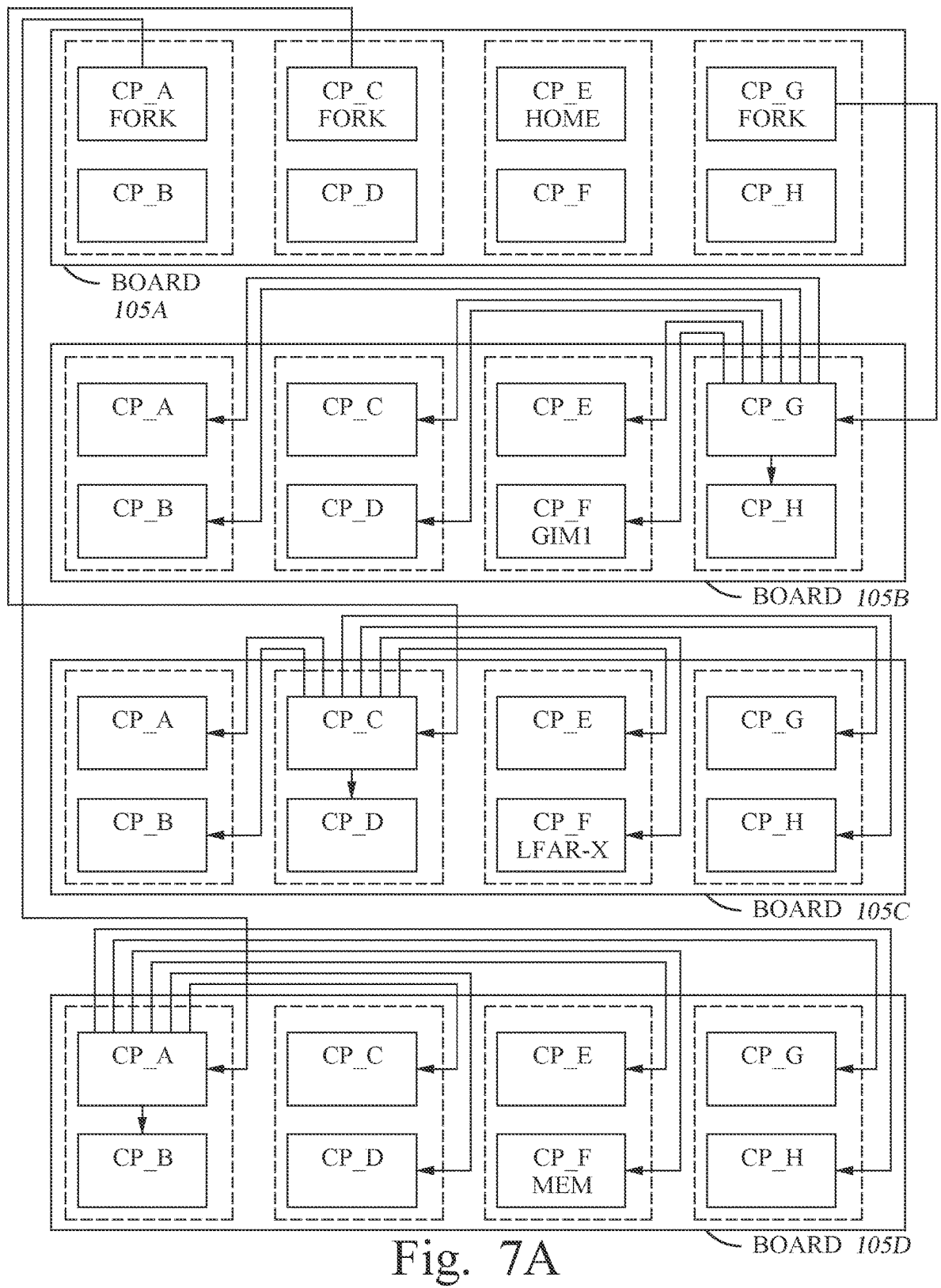
FIGS. 7A-7H illustrate identifying cached data in multiple boards, according to one embodiment.

In FIG. 7A, like in FIG. 6A, the processor CP_E is the requesting processor that is searching for the IM of the requested data. However, unlike in FIG. 6A, the IM for the data is not on the same board (i.e., the board 105A) but is on a different board. Specifically, the IM (labeled as the global IM (GIM1)) of the requested data is the processor CP_F on the board 105B.

The processor CP_E has determined that none of the processors on the board 105A are the IM for the requested data, and as such, has instructed the fork processors CP_A, CP_C, and CP_G on the board 105A to broadcast requests for the IM to the other boards 105B-D as shown in FIG. 7A. The request sent to board 105B is received by the processor CP_G (e.g., a branch processor), the request sent to board 105C is received by the processor CP_C (e.g., a branch processor), and the request sent to board 105D is received by the processor CP_A (e.g., a branch processor). Each of these branch processors on the three boards 105B-D then broadcast the request for the IM onto the processors on the same board. That is, each of the branch processor broadcast the request like as shown in FIG. 6A.

Figure 7B:
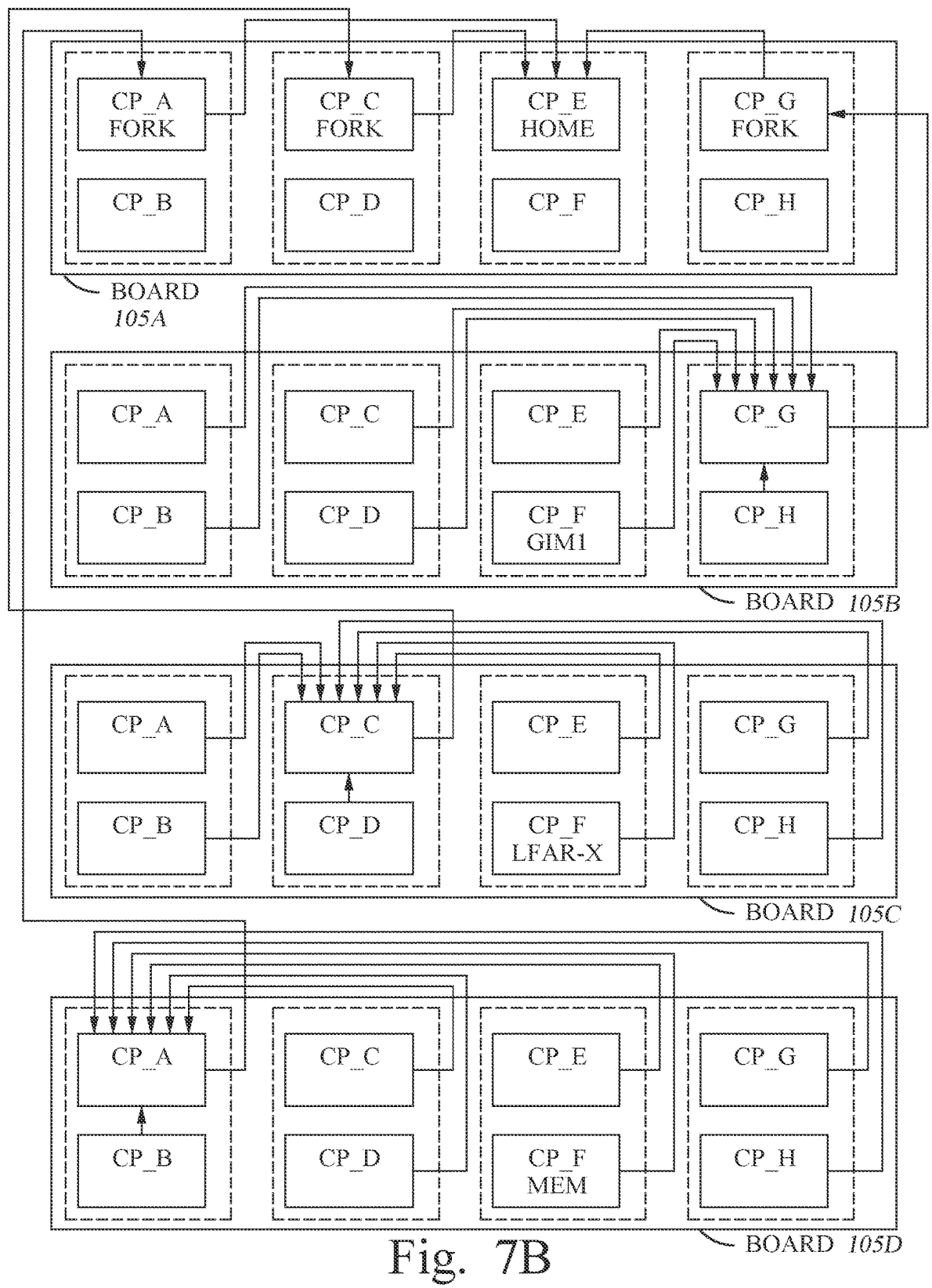

FIG. 7B illustrates the branch processors on each of the boards 105B-D collecting the partial responses PRESPs from each of the processors on the same board. As discussed in FIG. 6B, the other processors can tell the processor broadcasting the request (e.g., the branch processor) whether they are the IM for the data.

FIG. 7B further illustrates the branch processors forwarding the PRESPs to the fork processors CP_A, CP_C, and CP_G on the board 105A which in turn forward the PRESPs to the requesting processor CP_E. Based on the response, the requesting processor CP_E can determine that the processor CP_F on the board 105B is the IM for the requested data.

Figure 7C:
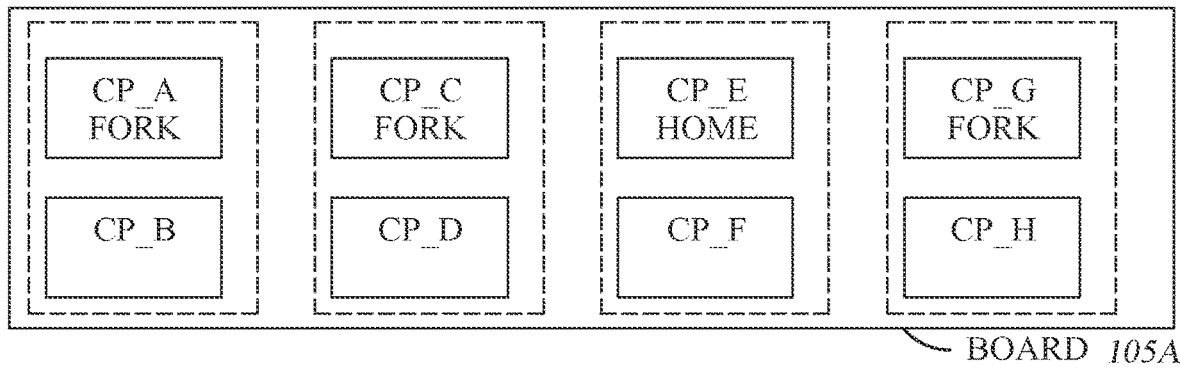
Figure 7C:
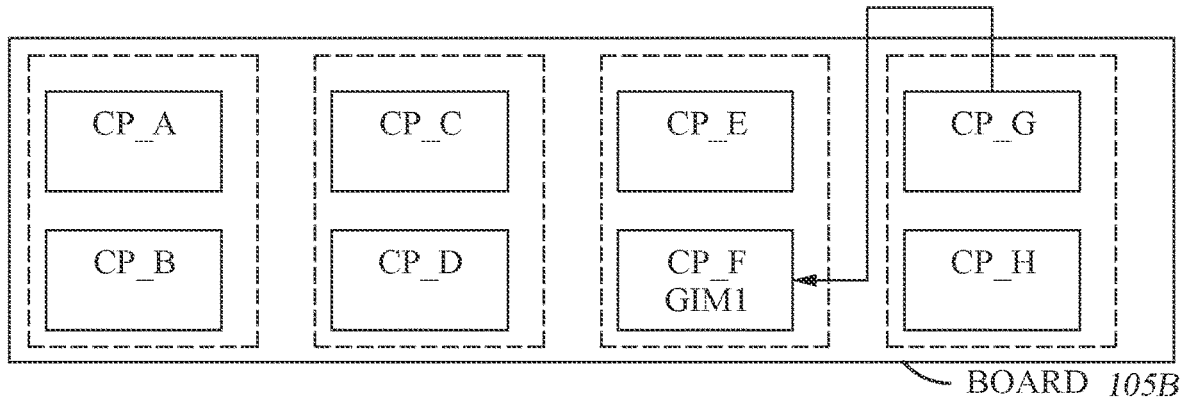
Figure 7C:
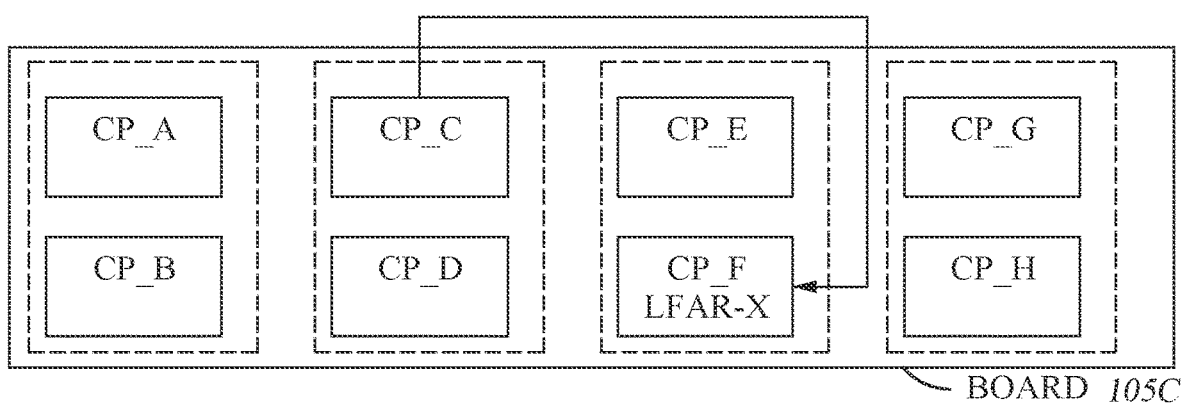
Figure 7C:
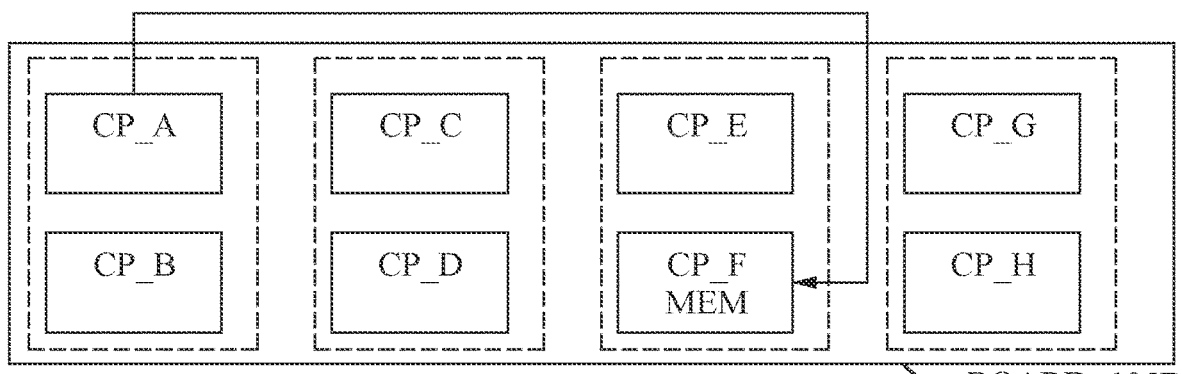

FIG. 7C illustrates a board-scope CRESP. As shown, each of the branch processors on the boards 105B-D send a CRESP based on the PRESPs it received from the other processors in the same board. These board-scope CRESPs can contain the same information as the CRESP discussed in FIG. 6C above.

Figure 7D:
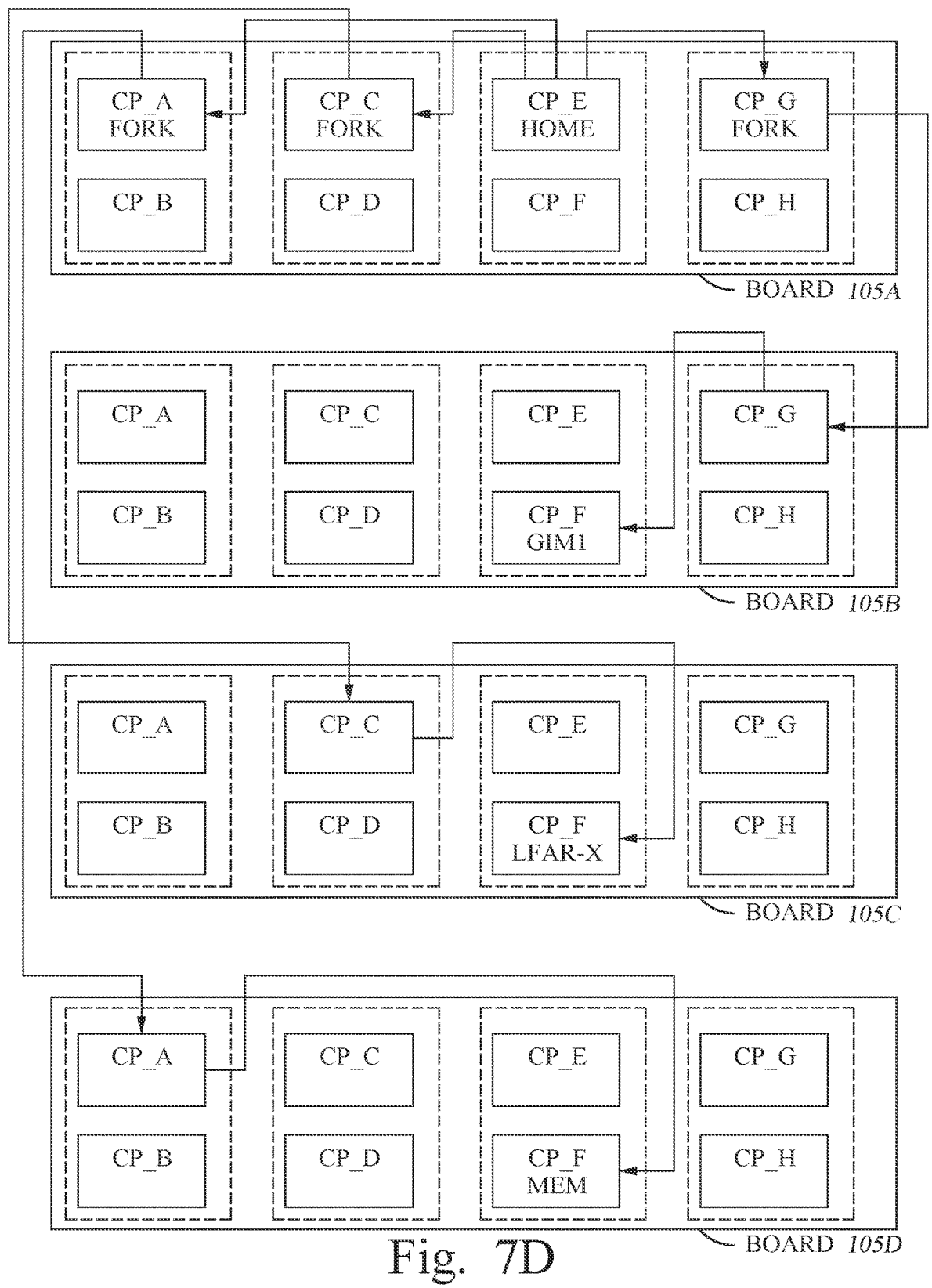

FIG. 7D illustrates a global-scope CRESP (or an inter-board-scope CRESP). The global CRESP originates from the requesting processor CP_E on board 105A. The CRESP is transmitted only to the fork processors in the board 105A which in turn forward the CRESP to the respective boards. As shown, the branch processors in the boards 105B-105D forward the CRESP only to the processors that are still part of the operation. That is, because only the processor CP_F in the board 105B is the IM for the data, the PRESPs sent by the other processors in the board 105B indicate they no longer need to participate in the cache operation because they are not the IM. As such, only the processor CP_F and the branch processor in the board 105B receives the CRESP. In board 105C, the CRESP is forwarded from the branch processor CP_C to only the processor CP_F which serves as the LFAR-X. The LFAR-X indicates the CP_F has a request in progress for the same line (e.g., the LFAR-X indicates a "compare" or "contention detected"). In board 105D, the CRESP is forwarded from the branch processor CP_A to only the processor CP_F which serves as a memory home of the requested data. The processor CP_F remained part of the cache operation since the memory home of the requested data may be the IM of the data if another processor has not yet been assigned the IM. In this case, because the processor CP_F on the board 105B was the IM, the CRESP informs the processor CP_F on the board 105D that the IM was found and it is no longer should participate in the cache operation. One advantage of the board-scope CRESP and the global-scope CRESP is that they only involve processors at the board-scope and the global-scope that are still participating in the cache operation.

Figure 7E:
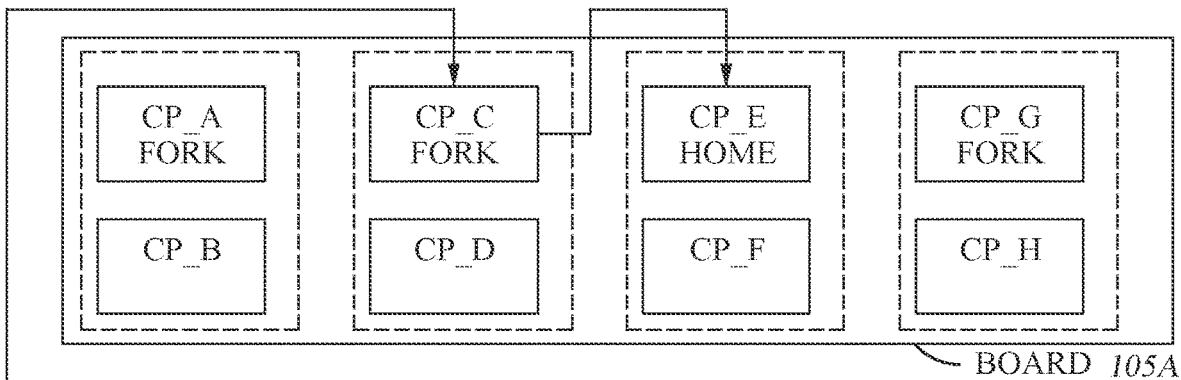
Figure 7E:
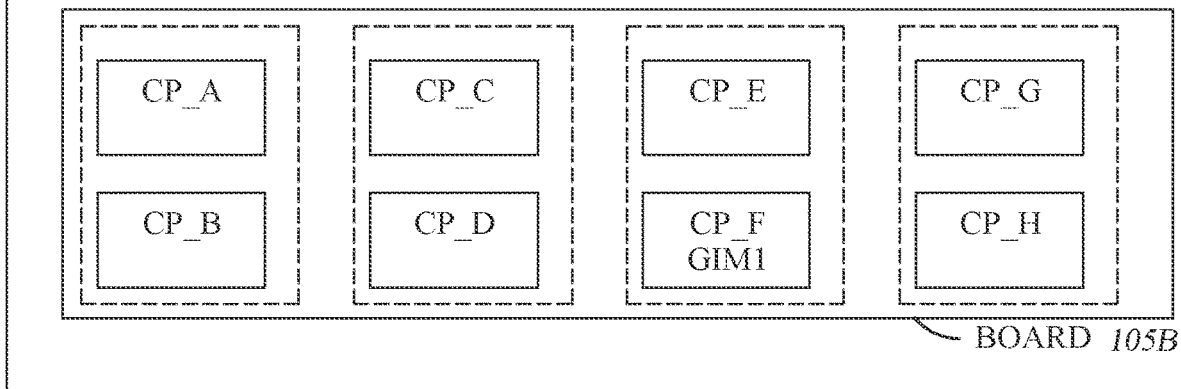
Figure 7E:
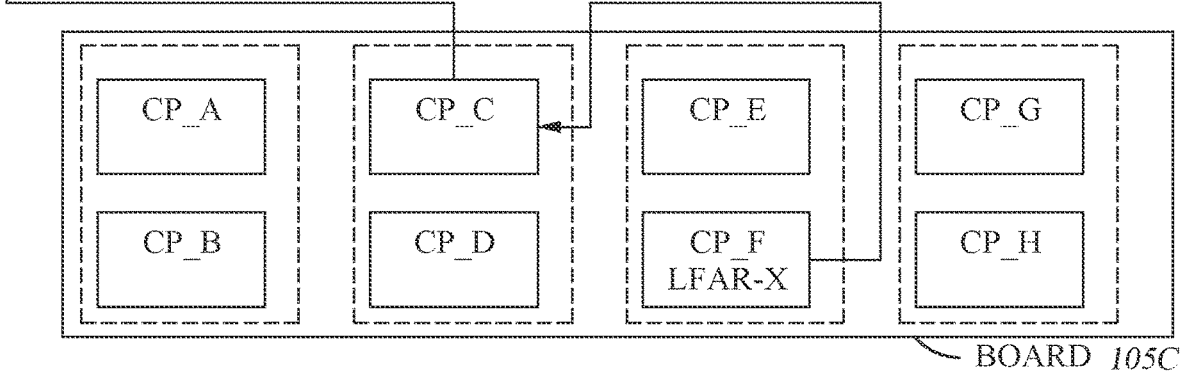
Figure 7E:
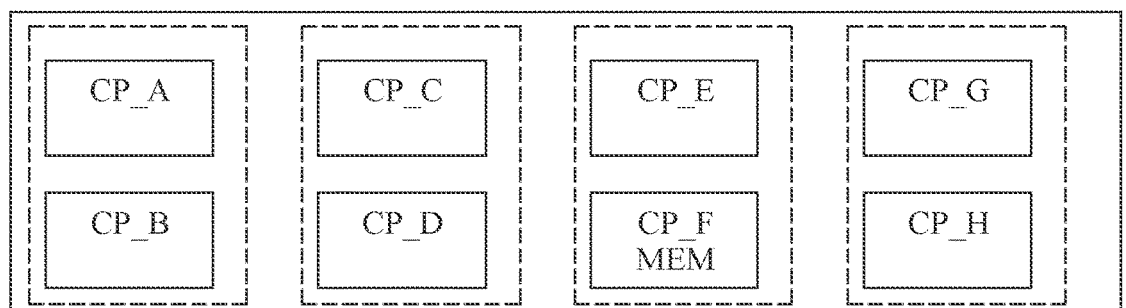

Since CP_F on Board 105C has a request for the same line in flight, the controller handling the request that originated from Board 105A waits until Board 105C received a Reject CRESP before sending RRESP back to CP_E chip on 105A. The compare is reported on the PRESP and the home processor waits for the RRESP from all chips that reported compares on the PRESP prior to sending the ERESP to the GIM1 processor. FIG. 7E illustrates the home processor CP_E on board 105 receiving the RRESP from the non IM processors (e.g., CP_F on board 105C), indicating an end of the compare operation. In FIGS. 7A-7E, the IM is moving from CP_F on board 105B to the CP_E on board 105A. The LFAR_X on CP_F on board 105C also wants to access this cache line and to maintain coherency the system ensures that it observes the IM movement. This is done by preventing the LFAR_X on CP_E Board 105A from completing until we know that LFAR_X on CP_F on board 105C has been rejected by either CP_F Board 105B or CP_E Board 105E. At the time of the PRESP in FIG. 7B, CP_F on board 105C will report a compare and a state machine will be loaded with a dependency on the LFAR_X. Once the LFAR_X on CP_F on board 105C has been rejected, the dependency is resolved and the state machine will send the RRESP. When the LFAR_X on CF_E on board 105A receives all the RRESPs from non-IM processors it knows all the dependencies that were encountered on the snoop have been resolved and all other requests have observed the IM transfer.

Figure 7F:
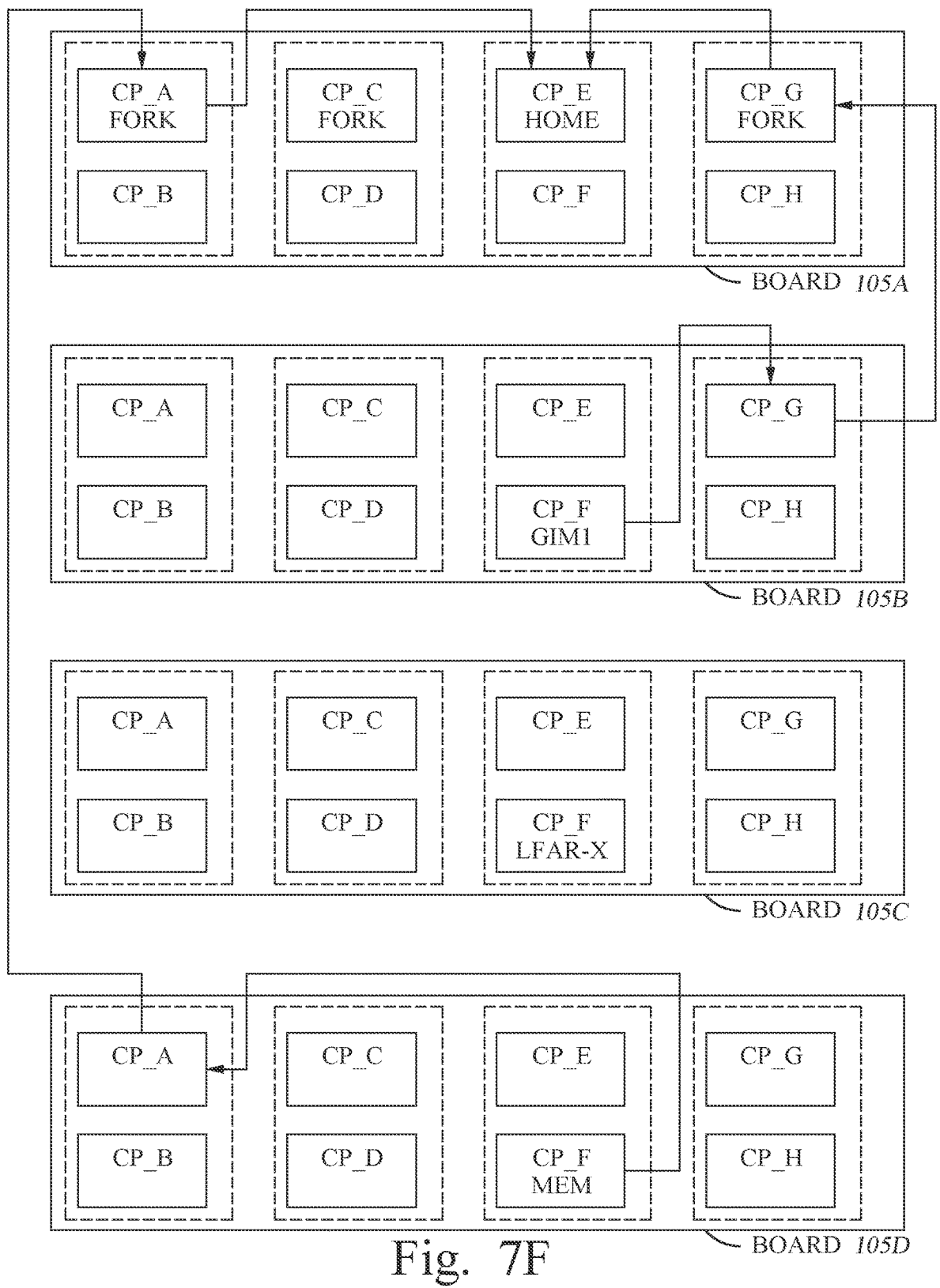

FIG. 7F illustrates the IM of the requesting data (i.e., the processor CP_F on the board 105B) and the memory home of the data (i.e., the processor CP_F on the board 105D) transmitting RRESPs to the requesting processor. In one embodiment, before sending the ERESP to the current IM, the requesting processor waits until receiving RRESPs from all the non-IM processors that indicated in their PRESPs that they have an outstanding request for the same line.

Figure 7G:
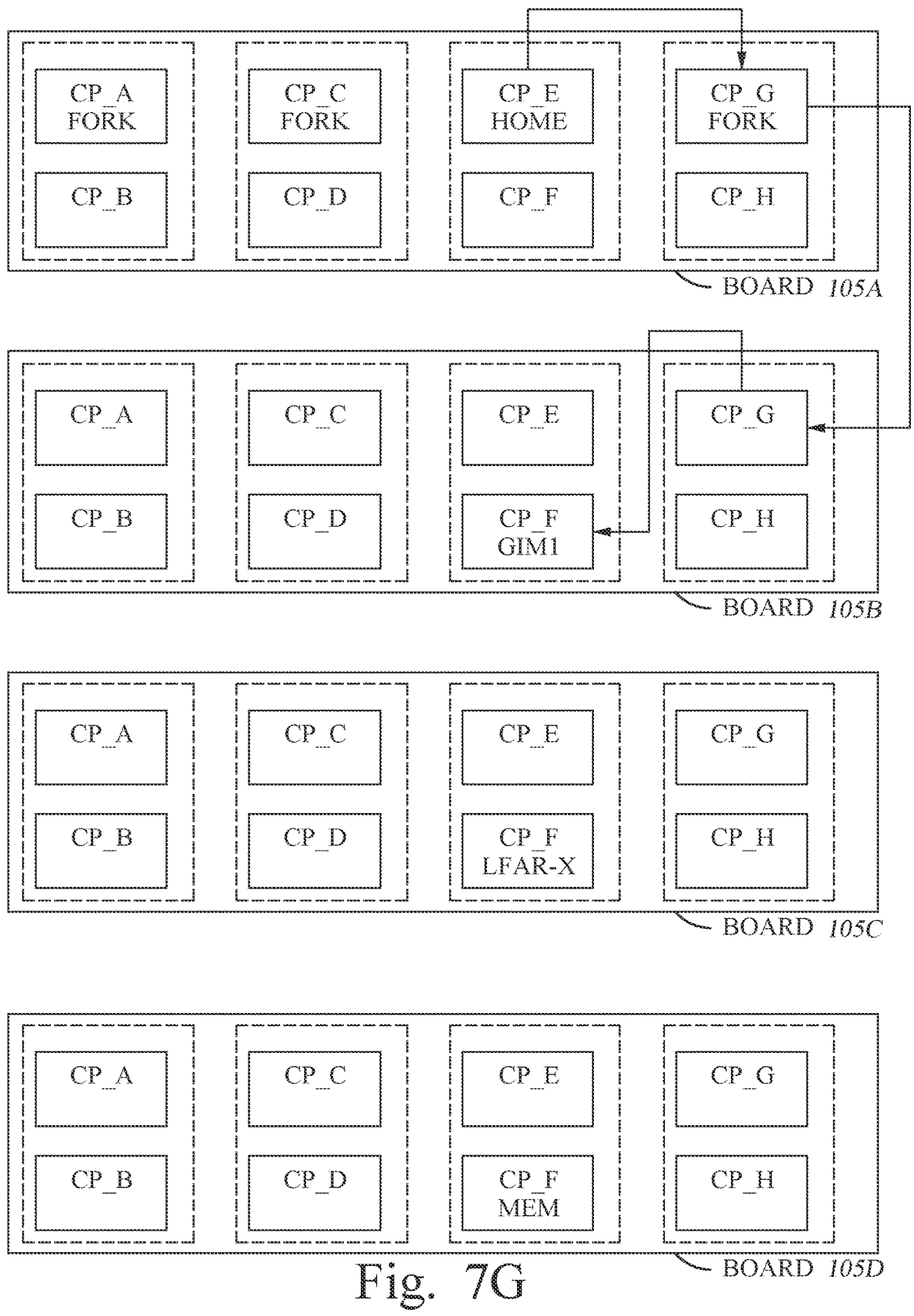

FIG. 7G illustrates the requesting processor CP_E transmitting an end of coherency ERESP to the IM. The ERESP tells the processor CP_F on the board 105B it is safe to stop protecting the requested data and that the home processor CP_E is now responsible for protecting the requesting data.

Figure 7H:
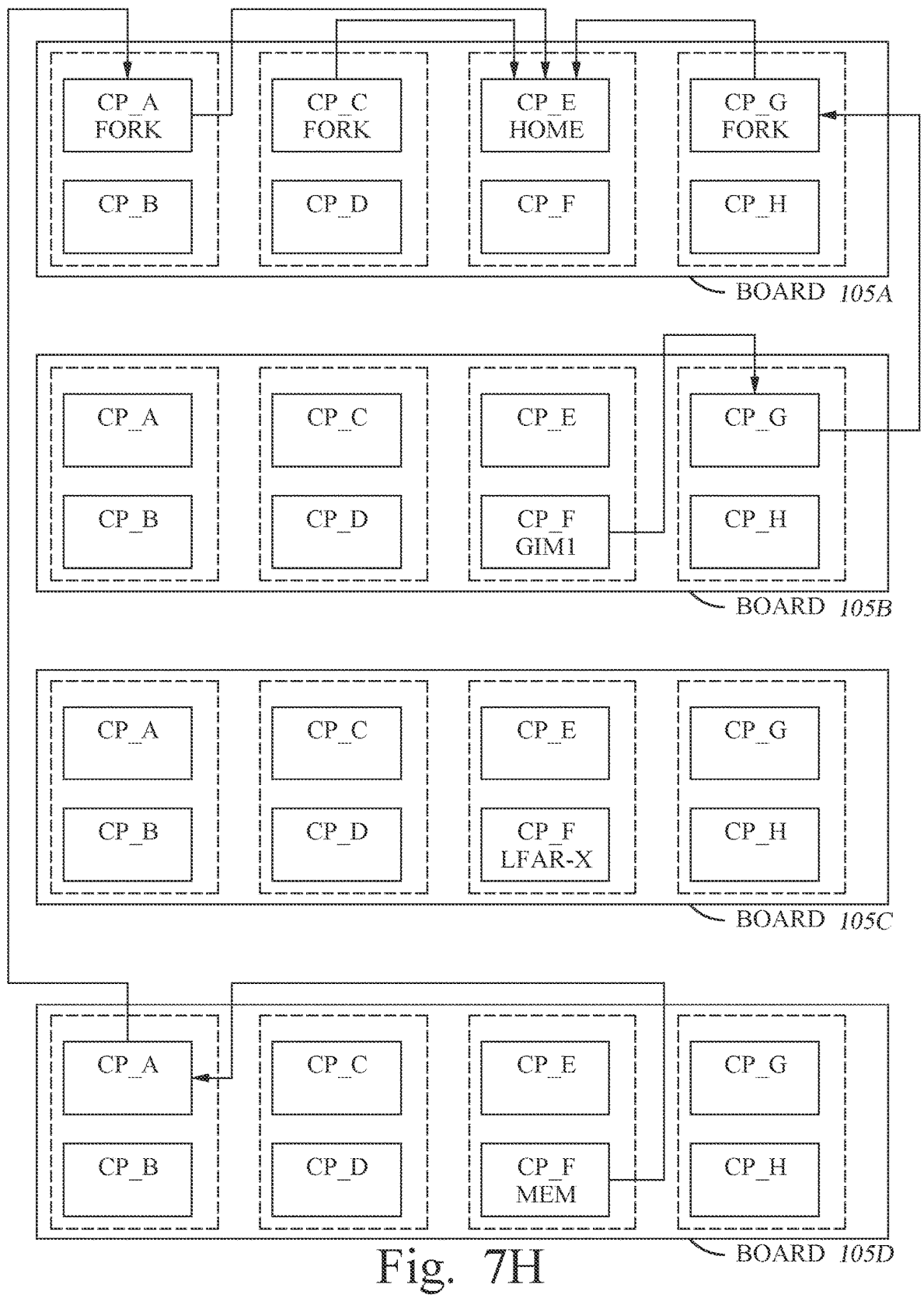

In response to receiving the ERESP, in FIG. 7H the processor CP_F on the board 105B transmits an RRESP to the processor CP_E on the board 105A indicating it is finished with the cache operation. Further, the ERESP indicates to the processor CP_E that any other requester for the same data (e.g., another processor on the board or on a different board) should have observed the transfer and that the data is in transit. This prevents conflicts where processors requesting the same data in parallel may not know which processor is currently the IM for the data.

Moreover, FIG. 7H illustrates the memory home of the data (i.e., processor CP_F on the board 105D) and the global IM of the data (i.e., processor CP_F on the board 105B) transmitting RRESPs to the home processor CP_E on board 105. Now, all the processor that participate in the operation have sent RRESPs to home processor. This is used to determine when the remote resource is available for use by another operation.

For performance reasons, the system can begin speculatively accessing the memory before knowing if the memory data is needed. At snoop time in FIG. 7A the system loads a state machine and starts a memory access. The Global CRESP indicates to the memory home (i.e., processor CP_F on the board 105D) that the memory data is not needed but the state machine on the memory chip still should send a message to indicate when it has completed Waiting for any operation in flight to get CRESPs on all the processor chips that reported compares before returning RRESPs to Home chip, and having the home chip delay ERESP to the global IM processor until the home chip receives all RRESPs from all chips that reported compares, ensures that all operations active for the same cache line observe the movement of the global IM to a new processor.

In one embodiment, there is no other operation that can block the IM from requesting the original from the IM, fetch hitting the IM, and castout/eviction of the IM. Whenever one or more requests are attempting to acquire a cache line, at least one is guaranteed to win. In one embodiment, the protocol has built-in mechanisms to ensure acquisition of additional resources needed to complete the operation. If a resource is held by non-IM requestor or a resource queue is formed, there is a mechanism to cancel non IM requesters so they can free up resources for IM requesters. Further, CRESP can contain information if the requester has IM permission for current scope or higher scopes.

In one embodiment, there is no other operation that can block a request from advancing to a higher, broadcast scope. That is, the protocols allows all new requesters to broadcast or be observed by other operations in flight. Before sending an ERESP in a scope, the request may wait until receiving RRESPs from all targets in the scope that have an outstanding request for the same cache line. Further, the requesting processor can honor any address compares in the requesting FBC itself. This is achieved by setting scope-based pending actions and system-based pending actions in the controllers, and setting need-to-wait actions for each other when appropriate to ensure system coherency. Further, the requesting processor may have to receive a CRESP for a higher-scope broadcast, if one is required.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   providing a cache coherent computing system comprising a plurality of boards, each board comprising a plurality of processors;
   requesting cached data for a first core in a first processor on a first board of the plurality of boards;
   upon determining that another core on the first processor does not have the requested cached data, broadcasting a request from the first processor to the other processors on the first board to determine whether one of the other processors is an intervention master (IM) of the requested cached data;
   receiving, at the first processor, partial responses (PRESP) from the other processors on the first board;
   determining, based on the PRESPs, none of the other processors on the first board are the IM, wherein a first one of the other processors indicates in its PRESP that it is not the IM but it is still participating in the request so it can forward the request to a second board of the plurality of boards; and
   broadcasting, after determining none of the other processors on the first board are the IM, a request to the other boards of the plurality of boards to determine whether one of the processors in the other boards is the IM.

2. The method of claim 1, wherein determining, based on the PRESPs, none of the other processors on the first board are the IM further comprises:
   determining, based on the PRESPs, which of the other processors are still participating in the request and other operations initiated by the other processors for the same cached data, wherein a second one of the other processors indicates in its PRESP that it is not participating in the request; and
   transmitting from the first processor a combined response (CRESP) to only the other processors that are still participating in the request.

3. The method of claim 2, wherein the first one of the other processors that is still participating in the request comprise fork processors in the first board that are assigned to communicate with a respective one of the plurality of boards.

4. The method of claim 3, wherein the second one of the other processors that is not participating in the request is a processor on the first board that is not a fork processor, does not have an operation in flight for the same cached data, and is not the IM of the requested cached data.

5. The method of claim 1, wherein broadcasting the request to the other boards of the plurality of boards further comprises:
   receiving the request at a respective branch processor at each of the other boards;
   broadcasting the request from the respective branch processors to the other processors in a same board;
   receiving, at the respective branch processors, PRESPs from the other processors in the same board reporting other operations in flight for the same cached data;
   forwarding the PRESPs from the other processors in the other boards to the first processor on the first board;
   transmitting a board-scope CRESP from the respective branch processors to only other processors in the same board that indicated they are still participating in the request based on the PRESPs; and
   transmitting a global-scope CRESP from the first board to the other processors in the other boards that indicated they are still participating in the request based on the PRESPs.

6. The method of claim 5, wherein a first one of the other processors indicating they are still participating in the request is the IM of the requested cached data or has an operation in flight for the same cached data, and a second one of the other processors indicating they are still participating in the request is not the IM of the requested cached data.

7. The method of claim 6, further comprising:
   receiving, at the first processor, a reset response (RRESP) from the second one of the other processors that is not the IM of the requested cached data; and
   transmitting, after receiving the RRESP, an end of coherency response (ERESP) from the first processor to the first one of the other processors that is the IM of the requested cached data.

8. The method of claim 7, wherein the ERESP is transmitted from the first processor to the first one of the other processors only after the first processor receives respective RRESPs from every one of the other processors indicating they are still participating in the request but is not the IM of the requested cached data or have another operation in flight for the same cached data.

9. The method of claim 7, further comprising:
   receiving a RRESP from the first one of the other processors, wherein the first processor becomes the IM of the requested cached data; and
   receiving a RRESP from one of the other processors that is a memory home of the requested cached data and all remaining processors participating in the request that did not have another operation in flight for the same cached data.

10. A cache coherent computing system, comprising:
a plurality of boards, each board comprising a plurality of processors,
wherein a first core in a first processor on a first board of the plurality of boards is configured to request cached data that is not stored in a cache assigned to the first core;
upon determining that another core on the first processor does not have the requested cached data, the first processor is configured to:
broadcast a request to the other processors on the first board to determine whether one of the other processors is an intervention master (IM) of the requested cached data,
receive partial responses (PRESP) from the other processors on the first board,
determine, based on the PRESPs, none of the other processors on the first board are the IM, wherein a first one of the other processors indicates in its PRESP that it is not the IM but it is still participating in the request so it can forward the request to a second board of the plurality of boards, and
broadcast, after determining none of the other processors on the first board are the IM, a request to the other boards of the plurality of boards to determine whether one of the processors in the other boards is the IM.

11. The cache coherent computing system of claim 10, wherein determining, based on the PRESPs, none of the other processors on the first board are the IM further comprises:
determining, based on the PRESPs, which of the other processors are still participating in the request and other operations initiated by the other processors for the same cached data, wherein a second one of the other processors indicates in its PRESP that it is not participating in the request; and
transmitting from the first processor a combined response (CRESP) to only the other processors that are still participating in the request.

12. The cache coherent computing system of claim 11, wherein the first one of the other processors that is still participating in the request comprise fork processors in the first board that are assigned to communicate with a respective one of the plurality of boards, wherein the second one of the other processors that is not participating in the request is a processor on the first board that is not a fork processor, does not have an operation in flight for the same cached data, and is not the IM of the requested cached data.

13. The cache coherent computing system of claim 10, wherein broadcasting the request to the other boards of the plurality of boards further comprises:
receiving the request at a respective branch processor at each of the other boards;
broadcasting the request from the respective branch processors to the other processors in a same board;
receiving, at the respective branch processors, PRESPs from the other processors in the same board reporting other operations in flight for the same cached data;
forwarding the PRESPs from the other processors in the other boards to the first processor on the first board;
transmitting a board-scope CRESP from the respective branch processors to only other processors in the same board that indicated they are still participating in the request based on the PRESPs; and transmitting a global-scope CRESP from the first board to the other processors in the other boards that indicated they are still participating in the request based on the PRESPs.

14. The cache coherent computing system of claim 13, wherein a first one of the other processors indicating they are still participating in the request is the IM of the requested cached data or has an operation in flight for the same cached data, and a second one of the other processors indicating they are still participating in the request is not the IM of the requested cached data.

15. The cache coherent computing system of claim 14, wherein the first processor is configured to:
receive a reset response (RRESP) from the second one of the other processors that is not the IM of the requested cached data; and
transmit, after receiving the RRESP, an end of coherency response (ERESP) from the first processor to the first one of the other processors that is the IM of the requested cached data.

16. A computer program product for maintaining a cache coherent computing system comprising a plurality of boards, each board comprising a plurality of processors, the computer program product comprising:
a computer readable storage medium having computer-readable program code embodied therewith, the computer readable program code executable by one or more computer processors to perform an operation, the operation comprising:
requesting cached data for a first core in a first processor on a first board of the plurality of boards,
upon determining that another core on the first processor does not have the requested cached data, broadcasting a request from the first processor to the other processors on the first board to determine whether one of the other processors is an intervention master (IM) of the requested cached data,
receiving, at the first processor, partial responses (PRESP) from the other processors on the first board,
determining, based on the PRESPs, none of the other processors on the first board are the IM, wherein a first one of the other processors indicates in its PRESP that it is not the IM but it is still participating in the request so it can forward the request to a second board of the plurality of boards, and
broadcasting, after determining none of the other processors on the first board are the IM, a request to the other boards of the plurality of boards to determine whether one of the processors in the other boards is the IM.

17. A cache coherent computing system, comprising:
a plurality of boards, each board comprising a plurality of processors,
wherein a first core in a first processor on a first board of the plurality of boards is configured to request cached data that is not stored in a cache assigned to the first core;
upon determining that another core on the first processor does not have the requested cached data, the first processor is configured to:
broadcast a request to the other processors on the first board to determine whether one of the other processors is an intervention master (IM) of the requested cached data;
receive partial responses (PRESPs) from the other processors on the first board;

determine, based on the PRESPs, which of the other processors are still participating in the request, wherein a first one of the other processors indicates in its PRESP that it is the IM, and a second one of the other processors indicates in its PRESP that it is not the IM but it is still participating in the request so it can forward the request to a second board of the plurality of boards; and transmit a combined response (CRESP) to only the other processors that indicate in their PRESPs that they are still participating in the request.

18. The cache coherent computing system of claim 17, wherein the second one of the other processors is a fork processor in the first board that is assigned to communicate with a second board of the plurality of boards on behalf of the processors on the first board.

19. The cache coherent computing system of claim 18, wherein the second one of the other processors is configured to transmit a reset response (RRESP) to the first processor after receiving the CRESP from the first processor, wherein the CRESP indicates to the second one of the other processor that the IM has been found and the second one of the other processor is not needed to communicate with the second board.

20. The cache coherent computing system of claim 19, wherein the first processor is configured to transmit an end-of-coherency response (ERESP) to the first one of the other processors after receiving the RRESP from the second one of the other processors and all processor that reported a PRESP indicating they have another operation in flight for the same cached data.

21. The cache coherent computing system of claim 20, wherein the first one of the other processors is configured to transmit a RRESP to the first processor after receiving the ERESP, wherein the first processor is a new IM for the requested cached data.

\* \* \* \* \*